(12) United States Patent
Ikeda et al.

(10) Patent No.: US 7,347,566 B2
(45) Date of Patent: Mar. 25, 2008

(54) PROJECTION LENS UNIT AND REAR PROJECTION TYPE IMAGE DISPLAY SYSTEM

(75) Inventors: Hidehiro Ikeda, Yokohama (JP); Shuji Kato, Yokohama (JP); Koji Hirata, Yokohama (JP); Naoyuki Ogura, Machida (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/649,544

(22) Filed: Jan. 3, 2007

(65) Prior Publication Data

US 2007/0109666 A1 May 17, 2007

Related U.S. Application Data

(62) Division of application No. 10/865,549, filed on Jun. 9, 2004, now Pat. No. 7,172,292.

(30) Foreign Application Priority Data

Aug. 25, 2003 (JP) .............................. 2003-299475

(51) Int. Cl.
*G03B 21/14* (2006.01)
*G02B 17/00* (2006.01)

(52) U.S. Cl. .................. 353/76; 353/100; 348/745; 359/365

(58) Field of Classification Search ............... 353/102, 353/100, 101, 74, 76, 37, 69, 70; 359/362, 359/649, 650, 662, 663, 715, 771–783, 365; 348/781, 756, 745
See application file for complete search history.

(56) References Cited

U.S. PATENT DOCUMENTS

| 4,564,269 A | 1/1986 | Uehara |
| 5,296,967 A | 3/1994 | Moskovich |
| 5,321,551 A * | 6/1994 | Choi ........................ 359/649 |
| 5,329,363 A | 7/1994 | Moskovich |

(Continued)

FOREIGN PATENT DOCUMENTS

JP  01-250916  10/1989

(Continued)

*Primary Examiner*—Andrew T. Sever
(74) *Attorney, Agent, or Firm*—Townsend and Townsend and Crew LLP

(57) ABSTRACT

An inexpensive projection lens unit in a rear projection type image display system, having a short focal distance (wide angle of viewing field), high focus and high contrast, and as well, including a power lens made of a glass material having a high refractive index in a range from 1.63 to 1.70 and an Abbe's number of not less than 50 with an optimized incident and emergent configuration in order to satisfactorily correct aberration with a enhanced focusing performance even with a shortened focal distance. Further, the power lens having a high refractive index can exhibit a high power, and accordingly, can carry out satisfactory aberration correction by optimizing the aspheric degree of a plastic lens even though the length of back focus is increased for enhancing the contrast.

18 Claims, 10 Drawing Sheets

U.S. PATENT DOCUMENTS

| | | | |
|---|---|---|---|
| 5,388,003 A * | 2/1995 | Naganuma et al. | 359/649 |
| 5,440,429 A * | 8/1995 | Kim | 359/649 |
| 5,455,713 A * | 10/1995 | Kreitzer | 359/649 |
| 5,659,424 A | 8/1997 | Osawa et al. | |
| 5,808,804 A | 9/1998 | Moskovich | |
| 6,297,860 B1 | 10/2001 | Moskovich | |
| 6,473,244 B1 * | 10/2002 | Sugano | 359/794 |
| 2002/0034017 A1 * | 3/2002 | Hirata et al. | 359/649 |
| 2006/0098125 A1 * | 5/2006 | Moskovich et al. | 348/779 |

FOREIGN PATENT DOCUMENTS

| | | |
|---|---|---|
| JP | 07-159688 | 6/1995 |
| JP | 09-049969 | 2/1997 |
| JP | 09-159914 | 6/1997 |

* cited by examiner

PROJECTION LENS UNIT AND REAR PROJECTION TYPE IMAGE DISPLAY SYSTEM

INCORPORATION BY REFERENCE

The present application is a divisional application of, and claims priority to, U.S. patent application Ser. No. 10/865,549, filed Jun. 9, 2004, now U.S. Pat. No. 7,172,292 which claims priority from Japanese application JP-2003-299475 filed on Aug. 25, 2003, the content of each of which is hereby incorporated herein by reference into this application.

BACKGROUND OF THE INVENTION

The present invention relates to a projection type image display system and a projection lens unit used therefor.

A projection lens unit used in a rear projection type image display system have been known as disclosed in, for example, JP-A-1-250916 and JP-A-7-159688, JP-A-9-159914. JP-A-1-250916 discloses a four-group-four lens configuration consisting of a spherical glass lens having high dispersion and a low refractive index as a power lens having a highest positive refractive power, and three aspherical lenses, and JP-A-7-159688 discloses a five-group-five lens configuration consisting of a spherical glass lens having lowe dispersion and a high refractive index as the power lens, and four aspherical lenses while JP-A-9-159914 discloses a six-group-six lens configuration consisting of a spherical glass lens having high dispersion and a low refractive index as the above-mentioned power lens, and five aspherical lenses.

It has been required that the projection lens unit used in a rear projection type image display system has a short focal distance in order to make the lens unit compact, can display an image which is bright in its entirety up to its peripheral edge, and has a satisfactory focusing function and a low cost. It is, in general, a most effective way to use a compact projection lens unit in which the focal distance is short while the number of used lenses is as small as possible in order to make the rear projection type image display system compact, and an inexpensive spherical glass lens is used as a power lens in order to reduce the cost. In general, the higher the refractive index, the higher the cost of the optical glass.

JP-A-1-250916 discloses a power lens made of optical glass having a refractive index of about 1.59 which is relatively low, an Abbe's number of 61.3 and having high dispersion (SK5 (trade name) manufactured by SCHOTT Co., has been typically used as such optical glass). This optical glass is typically used as optical glass for projection type optical lens units. Further, since this optical glass allows the projection lens unit to have a less number of lenses, the cost of the projection lens unit can be reduced. However, since the power lens is made of optical glass having a low refractive index and high dispersion, a desired refractive power cannot be obtained so that the focal distance becomes longer, resulting in difficulty of making the projection lens unit compact. In addition, aberration would be increased, which could be hardly corrected in a satisfactory manner. As a result, although the cost of the lens unit can be reduced, it is difficult to materialize a projection type display unit which is compact and which has satisfactorily corrected aberration.

The JP-A-7-159688 discloses optical glass having a refractive index of about 1.62 and an Abbe's number of 60.3, which has a high refractive index and high dispersion and which is for the above-mentioned power lens (SK16 (trade name) manufactured by SCHOTT Co. has been typically used as such optical glass). The cost of the optical glass is 2.1 times as high as that of the optical glass used in the projection lens unit disclosed in JP-A-1-250916, that is, the former is about two times as high as the latter. However, since the power lens is made of optical glass having a high refractive index and low dispersion, the focal distance can be shortened (the view angle is increased), and the projection type image display system can be made to be compact. Further, the number of spherical lenses for aberration correction is greater than that of the projection lens unit disclosed in JP-A-1-250916 by one so as to make the aberration correction satisfactory. As a result, the projection type image display system can be made to be compact, but the cost thereof can hardly be reduced.

JP-A-9-159914 discloses a power lens made of inexpensive optical glass having a low refractive index and high dispersion, the cost of the projection lens unit can be reduced. However, since the optical glass having a low refractive index and high dispersion, the curvature of the power lens is small so that aberration which would be caused becomes greater. Thus, a number of used aspherical lenses is larger, resulting in a larger number of components although aberration connection is satisfactory is satisfactory, and accordingly, the cost of the projection lens unit can hardly be reduced.

Further, it is required that the projection lens unit has enhanced contrast. In general, the focusing performance of a projection lens unit has been exhibited by only its imaging performance (a degree of aberration correction) of a projection lens. Meanwhile, a contrast ratio, for example, between brightness of a white letter displayed on a screen and brightness of black indication (no image signal) is an important factor for determining a focusing performance in view of an image quality of a rear projection type image display system. In order to enhance the contrast ratio, it is required to prevent light (stray light) from reflecting back to an original image displayed on an image source from lens groups in the projection lens unit.

Thus, it is required that the projection lens unit used in the rear projection type image display system can have a low cost, and can display a projected image having a high quality, being capable of satisfactory aberration correction even though the focal distance thereof is shortened (for broadening its view angle) in order to make the rear projection type image display unit compact.

SUMMARY OF THE INVENTION

The present invention is devised in view of the above-mentioned problems inherent to the conventional rear projection type image display system, and accordingly, an object of the present invention is to provide a technology which can make the rear projection type image display unit compact.

To the end, according to the present invention, there is used a glass material having a high refractive index of about, for example, 1.63 to 1.70 for a power lens having a highest positive refractive index in a projection lens unit. In particular, the refractive index is preferably in a range from about 1.63 to 1.660, and is more preferably about 1.6835 (about 1.638 to 1.639) Further, by optimizing the configuration of the power lens, the focal distance can be shortened, and the aberration correction can become satisfactory. In this case, chromatic aberration can be reduced by setting the Abbe's number of the glass material for the power lens, to a value not less than 50.

The cost reduction can be made by using a four-group-four lens configuration. Further, in the above-mentioned case, the aspherical lens for correcting aberration may have an aspherical coefficient of not less than 12-th order, the greater the order of the aspherical coefficient, the larger the degree of freedom of design. Thus, the aspherical lens may have a complicated configuration, resulting in enhancement of the capability of aberration correction, thereby it is possible to correct aberration with a high degree of accuracy.

Next, explanation will be hereinbelow made of a configuration which can attain the enhancement of the contrast. The lowering of the contrast performance is mainly caused by reflection of an image light beam that is caused at the atmospheric side interface (emergent surface) of a meniscus lens which is positioned nearest to an image source and which is faced with its concave surface toward the screen side. The reflected light comes back to an original image set up in the image source, and in particular, the reflected light which comes back to a low bright part of the original image may, in particular, affects the contrast performance so as to lower the contrast performance. Thus, according to the present invention, the atmospheric side interface of the above-mentioned meniscus lens is positioned, relatively far from the original image so as to lower the light energy of the reflected light coming back to the image source in order to enhance the contrast performance. This means that the back focus of the projection lens becomes longer, and in general, the longer the back focus, the more difficult, the aberration correction. The aberration caused by the longer back focus can be reduced by optimizing the aspheric degree and the inflection point of a plastic aspheric lens.

Further, the above-mentioned contrast performance can be enhanced by providing the meniscus lens with a wavelength selective filter which can absorb waves other than waves having a main wave length of the original image. With this configuration, the reflected light can be effectively reduced, and spurious components of emission spectrum of emitters can be cut off so as to decrease chromatic aberration, thereby it is possible to enhance the focusing performance.

According to the present invention, the rear projection type image display system can be made to be compact.

In addition to the above-mentioned objects and advantages of the present invention, further objects and advantages of the present invention will be apparent in the following specific embodiments of the present invention which will be described with reference to the accompanying drawings wherein:

BRIEF DESCRIPTION OF THE PREFERRED EMBODIMENT

Figure 1:
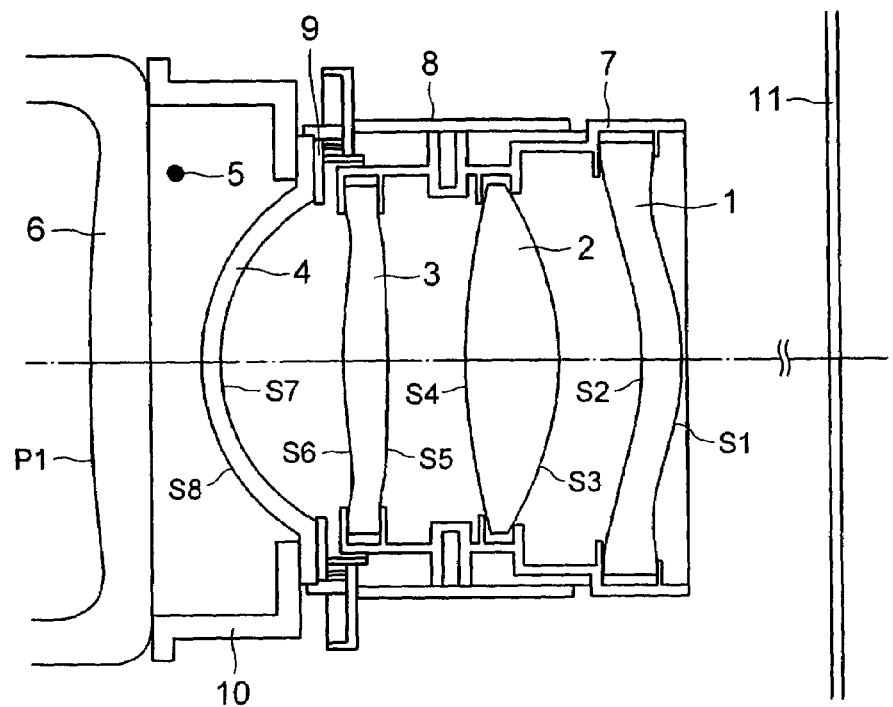
FIG. 1 is a sectional view illustrating a projection lens unit in an embodiment of the present invention.

Explanation will be hereinbelow made of several embodiments of the present invention with reference to the accompanying drawings in which like reference numerals are used to denote like parts.

Figure 2:
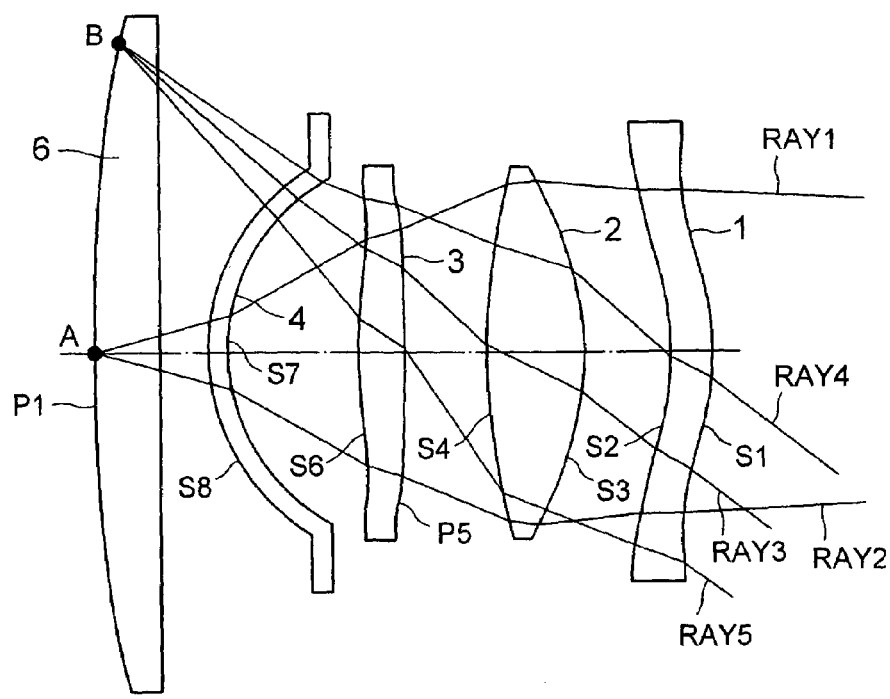
FIG. 2 is a view for explaining a result of tracing light beams in the projection lens unit in the embodiment of the present invention.
Figure 3:
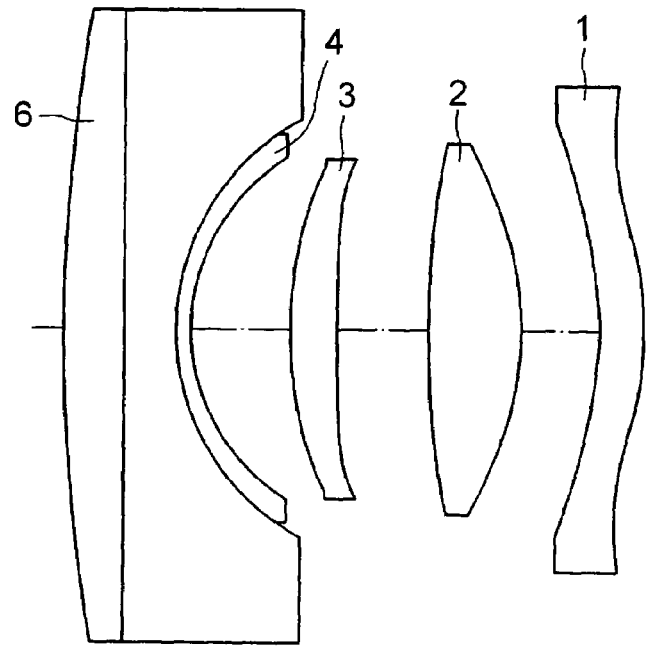
FIG. 3 is a sectional view illustrating a projection lens unit on the basis of lens data exhibited in Table 2.
Figure 4:
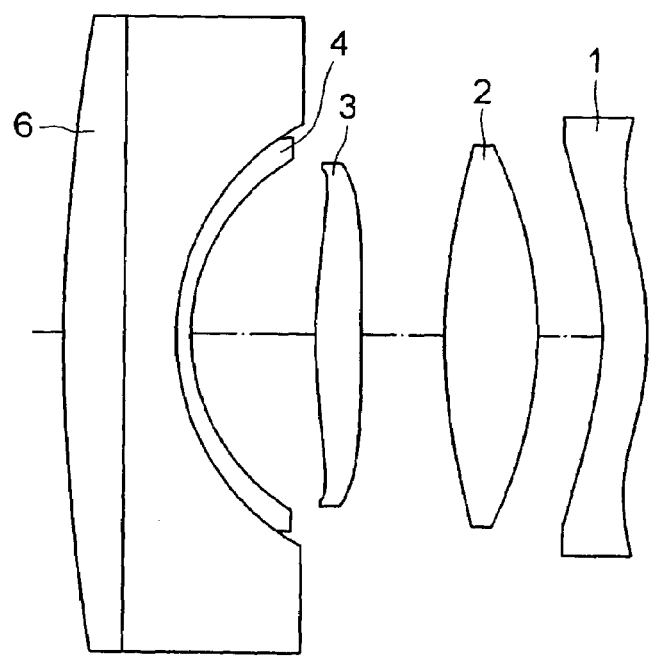
FIG. 4 is a sectional view illustrating a projection lens unit on the basis of a lens data exhibited in Table 3.
Figure 5:
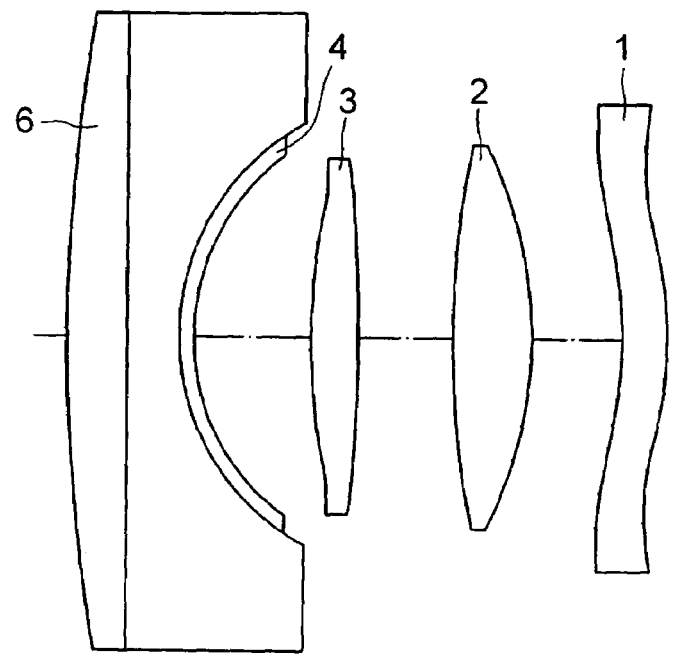
FIG. 5 is a sectional view illustrating a projection lens unit on the basis of lens data exhibited in Table 4.
Figure 6:
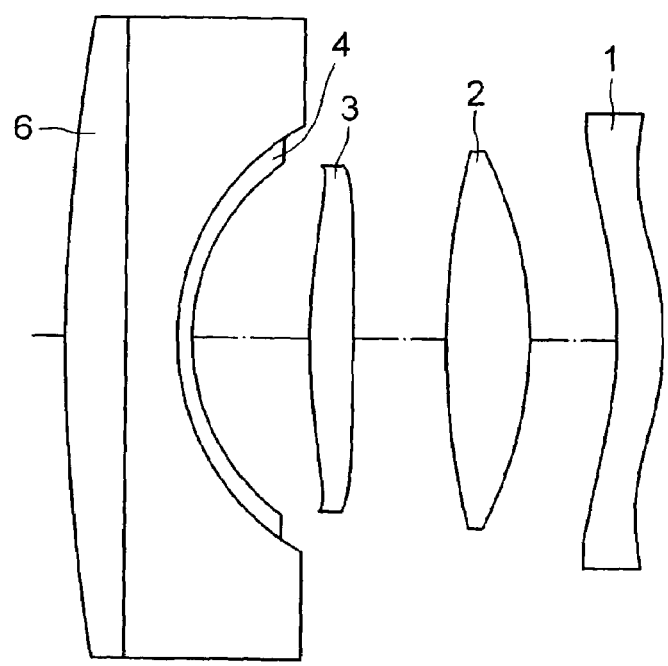
FIG. 6 is a sectional view illustrating a projection lens unit on the basis of lens data exhibited in Table 5.
Figure 7:
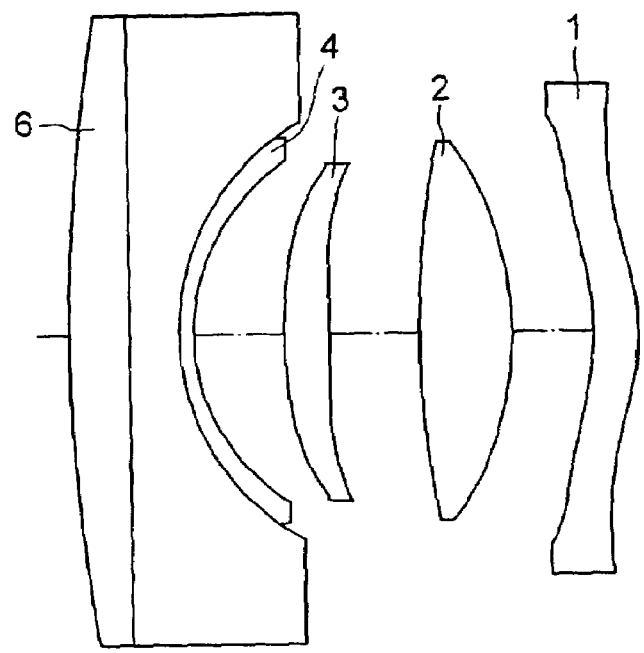
FIG. 7 is a sectional view illustrating a projection lens unit on the basis of lens data exhibited in Table 6.
Figure 8:
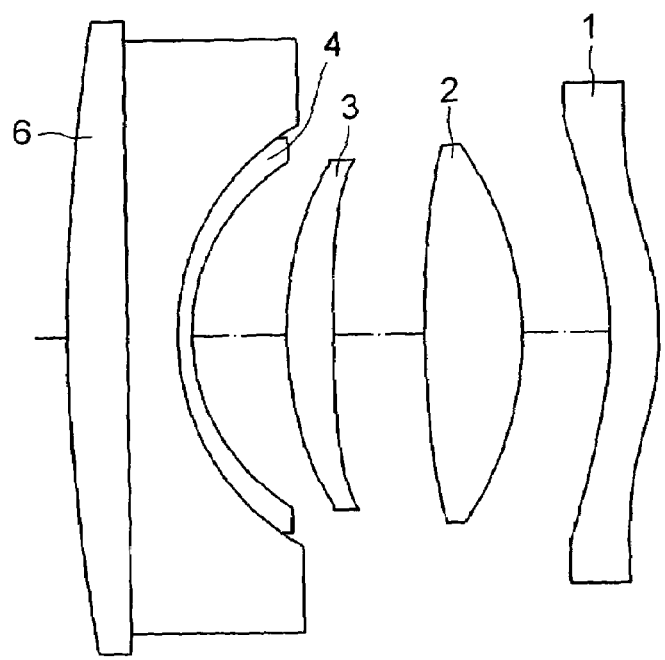
FIG. 8 is a sectional view illustrating a projection lens unit on the basis of lens data exhibited in Table 7.
Figure 9:
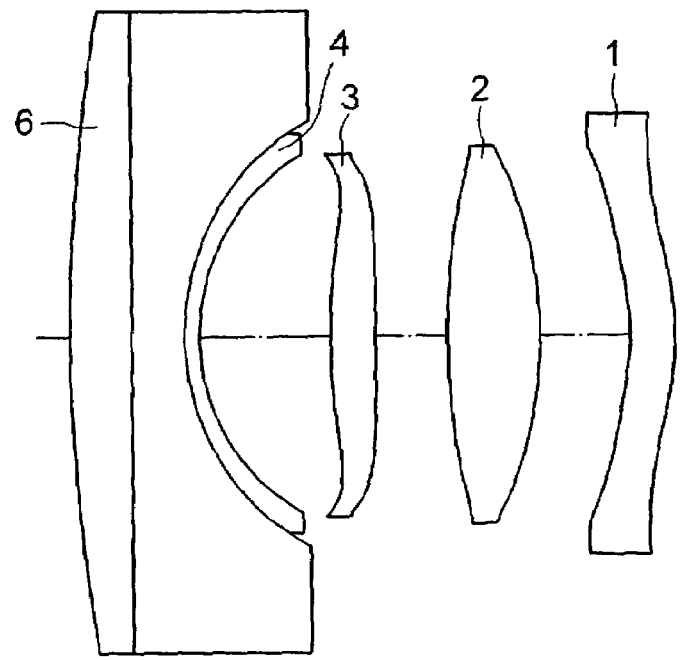
FIG. 9 is a sectional view illustrating a projection lens unit on the basis of lens data exhibited in Table 8.
Figure 10:
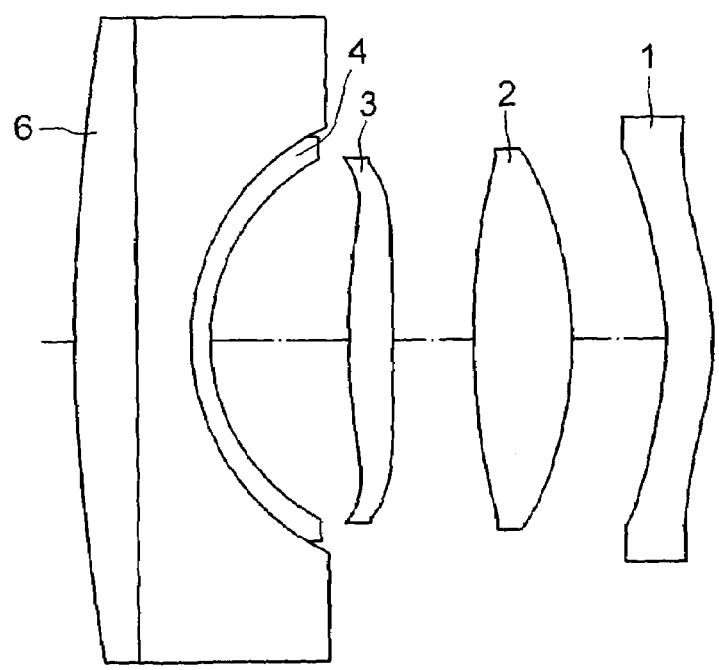
FIG. 10 is a sectional view illustrating a projection lens unit on the basis of lens data exhibited in Table 9.
Figure 11:
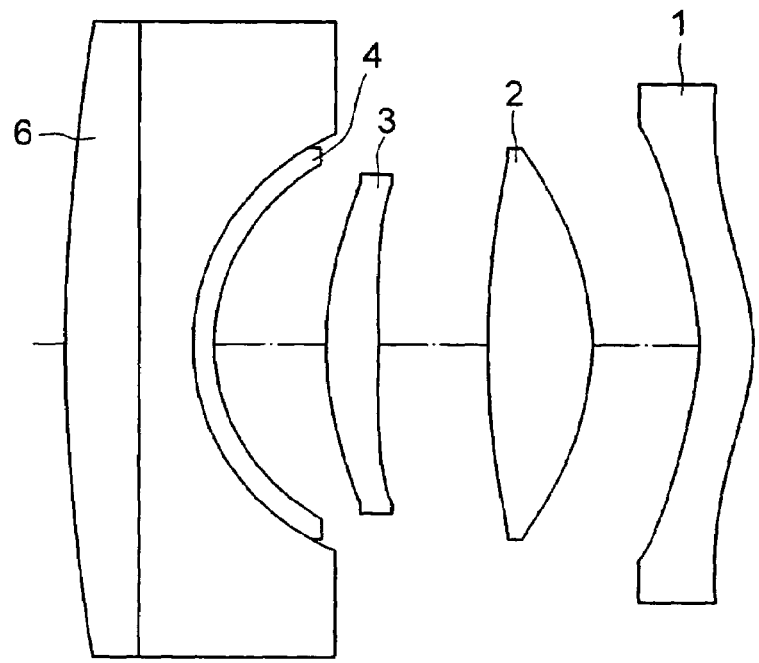
FIG. 11 is a sectional view illustrating a projection lens unit on the basis of lens data exhibited in Table 10.
Figure 12:
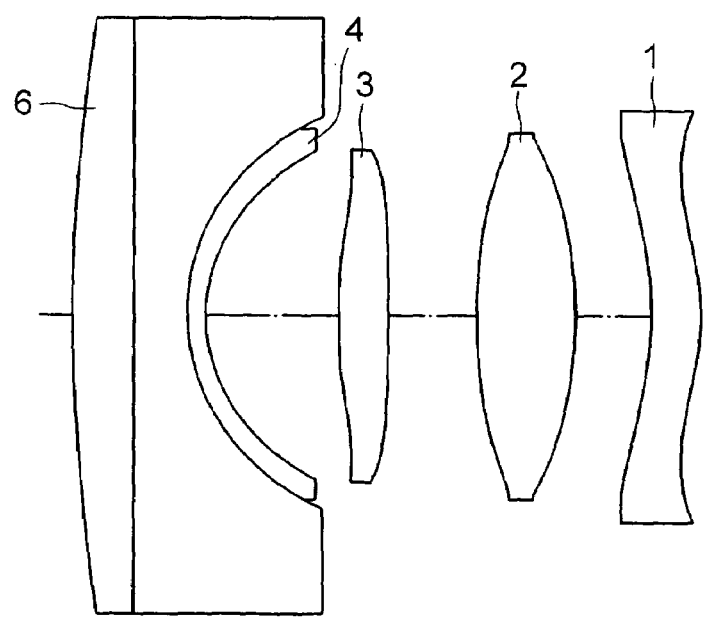
FIG. 12 is a sectional view illustrating a projection lens unit on the basis of lens data exhibited in Table 11.

FIG. 1 is a sectional view illustrating a main portion of a projection lens unit in an embodiment of the present invention, having a sectional configuration on the basis of lens data exhibited in Table 1. Explanation will be hereinbelow made of workings of respective lenses in the embodiment of the present invention shown in FIG. 1, with reference both FIGS. 1 and 2. A first group lens 1 shown in FIG. 2 is a plastic lens for correcting spherical aberration for an imaging beam (having an upper hedge ray RAY1 and a lower hedge ray RAY2) traveling from an object point A on the optical axis, and correcting coma-aberration and astigmatism for an imaging beam (having an upper hedge ray RAY 4 and a lower hedge ray RAY 5) from an object point B on a peripheral part of a screen, A second group lens 2 reduces coma-aberration caused in the peripheral part of the screen by optimizing a ratio between curvatures of an emergent surface S3 and an incident surface S4 thereof, and is a glass lens for reducing a drift of the focusing performance caused by temperature variation. This second group lens 2 has a positive refractive power which is highest among lenses in the projection lens unit, that is, it is the so-called power lens. A third group lens 3 is a plastic lens for correcting higher order coma-aberration and astigmatism for the imaging beam (having the upper hedge ray RAY 4 and the lower hedge ray RAY 5) from the object point B in the peripheral part of the screen. A four group lens 4 is a plastic lens for correcting a curvature of field together with a fluorescent surface P1 of a projection tube (cathode ray tube).

Next, explanation will be hereinbelow made of a projection lens configuration in this embodiment of the present invention with reference to FIG. 1. A four group lens 4 is a meniscus lens having a concave surface facing the screen 11 side, and making contact with a cooling liquid 5 for cooling the incident surface thereof and the projection tube. The cooling liquid 5 is filled in a space defined between the four group lens 4 and a projection tube panel 6 in a liquid tight manner. As a result, the four group lens 4 including the cooling liquid 5 has a negative refractive power. Further, all lenses from the first group 1 to the third group lens 3 are incorporated in an inner lens barrel 7. Further, the inner lens barrel 7 is incorporated and fixed in an outer lens barrel 8 which is fixed to a bracket 10 through the intermediary of a stationary plate 9. Moreover, the four group lens 4 magnifies an image on the fluorescent surface P1 of the projection tube serving as an object surface and projects the same on the screen 11. It is noted that the focal distance of the four group lens 4 in this embodiment can be calculated, including the panel 6 of the projection tube, the cooling liquid 5 and the fluorescent surface P1.

Tables 1 to 15 exhibit lens data for lens configurations corresponding to the projection lens unit in the embodiment shown in FIGS. 1 to 12. Explanation will be made of how to read the lens data exhibited in Tables 1 to 15 with reference to Table 1. Lens data is divided into two groups, that is, spherical group mainly relating to a lens zone near the optical axis, and an aspheric group relating the outer peripheral zone around the lens zone. As a typical example, Table 1 exhibits lens data in a sectional configuration shown in FIGS. 1 and 2, Table 2 lens data in FIG. 3, Table 3 lens data in FIG. 4, Table 4 lens data in FIG. 5, Table 5 lens data in FIG. 6, Table 6 lens data in FIG. 7, Table 7 lens data in FIG. 8, Table 8 lens data in FIG. 9, Table 9 lens data in FIG. 10, Table 10 lens data in FIG. 11, and Table 11 lens data in FIG. 12.

At first, there have been exhibited as follows: The screen 11 has a radius of curvature which is indefinite (that is a planar surface), and the distance (surface-to-surface space) from the screen 11 to the surface S1 of the first group lens 1 on the optical axis is 823 mm while the medium in the space has a refractive index of 1. Further, the radius of curvature of the lens surface S1 is 69.79931 mm (having a curvature center on the image source side), and a distance (surface-to-surface space) between the lens surfaces S1 and S2 on the optical axis is 10 mm while the medium in the space has a refractive index 1.4924. Then, similarly, a radius of curvature of the fluorescent surface P1 of the projection tube panel 6 is 350 mm, a thickness of the projection tube panel 6 on the optical axis is 14.1 mm while the refractive index thereof is 1.56232. Aspheric coefficients as to the surfaces S1, S2 of the first group lens 1, the surfaces S5, S6 of the third group lens 3 and the surface S7 of the fourth group lens 4 are also exhibited.

It is noted that the aspheric coefficients are used in the following formula which exhibits a lens surface configuration:

$$Z(r) = \frac{r^2/RD}{1+\sqrt{1-(1+K)r^2/RD^3}} + Ar^4 + Br^6 + Cr^8 + Dr^{10} + Er^{12} + Fr^{14} + \ldots + Zr^{2n} \quad (1)$$

where K, A, B, C, D, E, F, . . . Z are arbitrary constants, n is an arbitrary non-negative integer, and RD is a radius of curvature.

Figure 13:
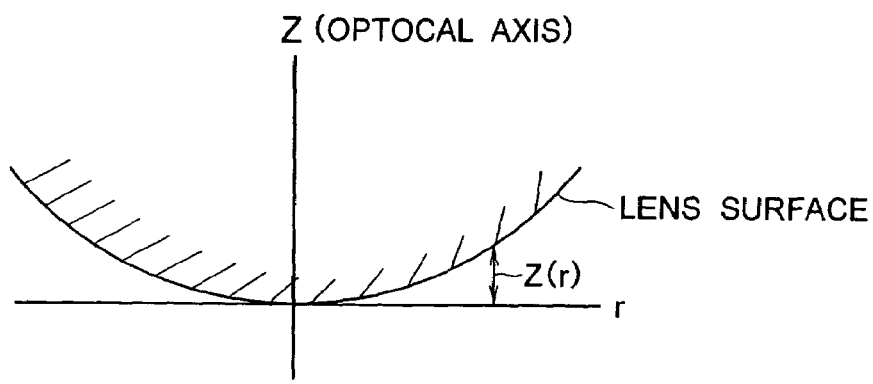
FIG. 13 is a view for explaining a function Z(R) exhibiting a sectional configuration of a lens.
Figure 14:
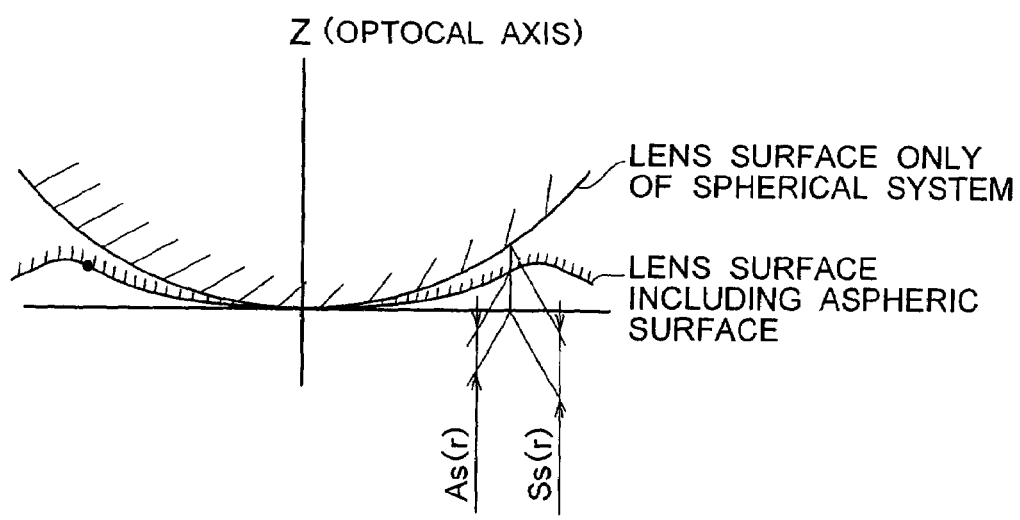
FIG. 14 is a view for explaining the function Z(r) exhibiting the sectional configuration of a lens and an aspheric degree thereof.

As shown in FIGS. 13 and 14 with which the definition of the lens configuration has been explained, Z(r) in the above-mentioned formula (1) exhibits a height of the lens surface measured at a radial position r along the Z-axis taken in the direction of the optical axis from the screen toward the image source. That is, r exhibits a radial distance and RD exhibits a radius of curvature. Thus, the coefficients K, A, B, C, D, E, F and the like can be given, and the heights of the lens surface (which will be hereinbelow referred to as "sag values", that is, the configuration thereof can be obtained from the above-mentioned formula. Further, the aspheric coefficients A, B, C, D, E, F . . . will be defined as coefficients of orders of r, that is, 4-th order, 6-th order, 8-the order, 10-th order, 12-th order, 14-th order . . . , respectively.

In this embodiment, for cost reduction, the power lens having a highest refractive power among the lenses in the projection lens unit, is made of a high dispersion glass material having a refractive index of not greater than 1.700, in particular, not less than 1.630 but not greater than 1.700, and an Abbe's number of not less than 50. Preferably, the refractive index preferably is 1.6385 (in a range from about 1.638 to 1.639). In general, a glass material having a high refractive index is expensive, and accordingly, a power lens having a low refractive index has been conventionally used, and as a result, a sufficient refractive power have not been able to be obtained so that the focal distance of an objection lens unit becomes longer, thereby it has been difficult to obtain a compact rear projection type image display system. However, these years, optical glass materials have been commercially available through international purchase, and accordingly, there are no price differences which have been conventionally present. Thus, glass materials having high refractive indices even up to about 1.7 are commercially available at low costs.

Thus, according to the present invention, a glass material having a high refractive index is used to shorten the focal distance, thereby it is possible to aim at making the projection lens unit compact. Should the Abbe's number be not greater than 50, chromatic aberration would be caused, resulting in deterioration of the focusing performance. Thus, a glass material having an Abbe's number of not less than 50 is used. Further, as shown in FIG. 2, the imaging beam (RAY1 and RAY2) traveling from the object point A on the optical axis, and the imaging beam (having RAY3, RAY4 and RAY5) traveling from the object point B pass through different zones of the power lens, respectively, and as a result, spherical aberration and coma-aberration are caused, respectively. These aberrations has a trade-off relationship therebetween, that is, should one of them be corrected, the other of them would deteriorate. Thus, the incident and emergent surfaces of the power lens are configured so as to have the following power allocation in order to correct both aberrations with good balance:

$$49 < (1/P_2) < 57$$

where $P_2 = \{(1/R_3) - (1/R_4)\}$ $R_4$: radius of curvature of the incident surface of the power lens; and $R_3$: radius of curvature of the emergent surface of the power lens.

Figure 17:
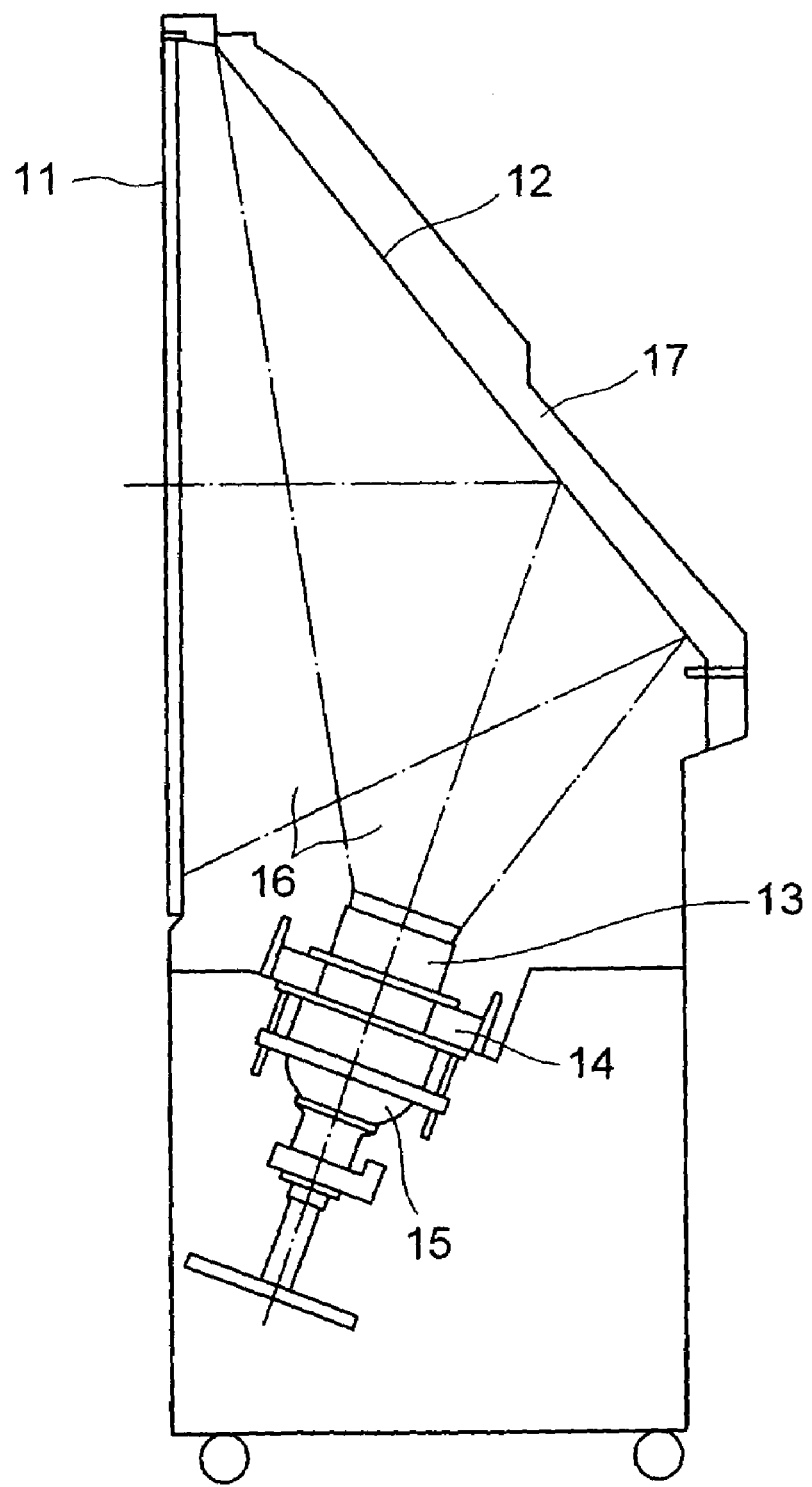
FIG. 17 is a vertical sectional view illustrating a rear projection type image display system.

As a result, the projection lens unit in the embodiment of the present invention can have a satisfactory focusing performance even though it has a short projection distance of 823 mm in such a case that a five inch raster on the fluorescent surface P1 of the projection tube is magnified into a 53 inch image and projected onto a screen. As a result, as shown in FIG. 17, a rear projection type image display system even using a single fold-back mirror 12 can become sufficient compact. It is noted that detailed explanation will be later made of the configuration shown in FIG. 17.

Further, in the embodiments of the present inventions exhibited in Table 1 to 15, the relationship exhibited in Table 22 can be established. In this table, there are given the forcal distance $f_0$ of the entire optical system of the projection lens unit, the focal distance $f_1$ of the first group lens 1, the focal distance $f_2$ of the second group lens 2, the focal distance $f_3$ of the third group lens $f_3$ and the focal distance $f_4$ of the fourth group lens 4. That is, the relationship between the focal distances of the lenses and the focal distance of the entire optical system of these lenses (that is, the power allocation of these lenses) satisfies the following conditions:

$0.01 < (f_0/f_1) < 0.15$ $0.85 < (f_0/f_2) < 0.95$ $0.30 < (f_0/f_3) < 0.45$ $-0.75 < (f_0/f_4) < -0.50$

Next, explanation will be made of configurations of aspheric lens which has a role of aberration correction. Referring to FIG. 14 which is a view for explaining an aspheric surface As(r), respective values are substituted in the terms of the above-mentioned aspheric formula so as to have a lens surface which is deviated from a lens surface Ss(r) of a mere spherical group by (As(r)–Ss(r)). Further, the smaller the absolute value of the rate (As(r)/Sd(r)) therebetween, the larger the degree of the aspheric surface. Further, inflection points at which the inclination of the surface varies at arbitrary positions r where the secondary differentiate value of the aspheric formula becomes zero, are present in this aspheric formula. The larger the number of the inflection points, the more complicate the aspheric configuration.

According to the present invention, the configuration of the aspheric lens having a role of aberration correction is given an aspheric surface exhibited by aspheric coefficients of an order not less than 14-th order.

Tables 17 to 21 exhibit degrees of the aspheric coefficients (Asn/Ssn, where n is a surface number) and numbers of inflection points. Table 17 exhibits the emergent surface S1 of the first group lens 1 while Table 18 the incident surface S1 of the first group lens 2, Table 19 the emergent surface S5 of the third group lens 3 while Table 20 the incident surface S6 of the third group lens 3, and Table 21 the emergent surface S7 of the forth group lens 4.

As shown in Tables 17 to 21, among the lenses constituting the projection lens unit, at least one of the surfaces has two inflection points within the effective radius of each lens, and as to (As$_n$/Ss$_n$) which exhibits a degree of an aspheric surface, the following relationship is established:

$0.15 < (As_1/Ss_1) < 0.35$ $0.470 < (As_2/Ss_2) < 0.75$ $-79.65 < (As_5/Ss_1) < 63.75$ $0.10 < (As_6/Ss_6) < 1.35$ $0.90 < (As_7/Ss_7) < 1.35$

With the configuration as stated above, an aspheric lens having a role of aberration correction for the projection lens unit, can obtain a sufficient capability of aberration correction.

Figure 15:
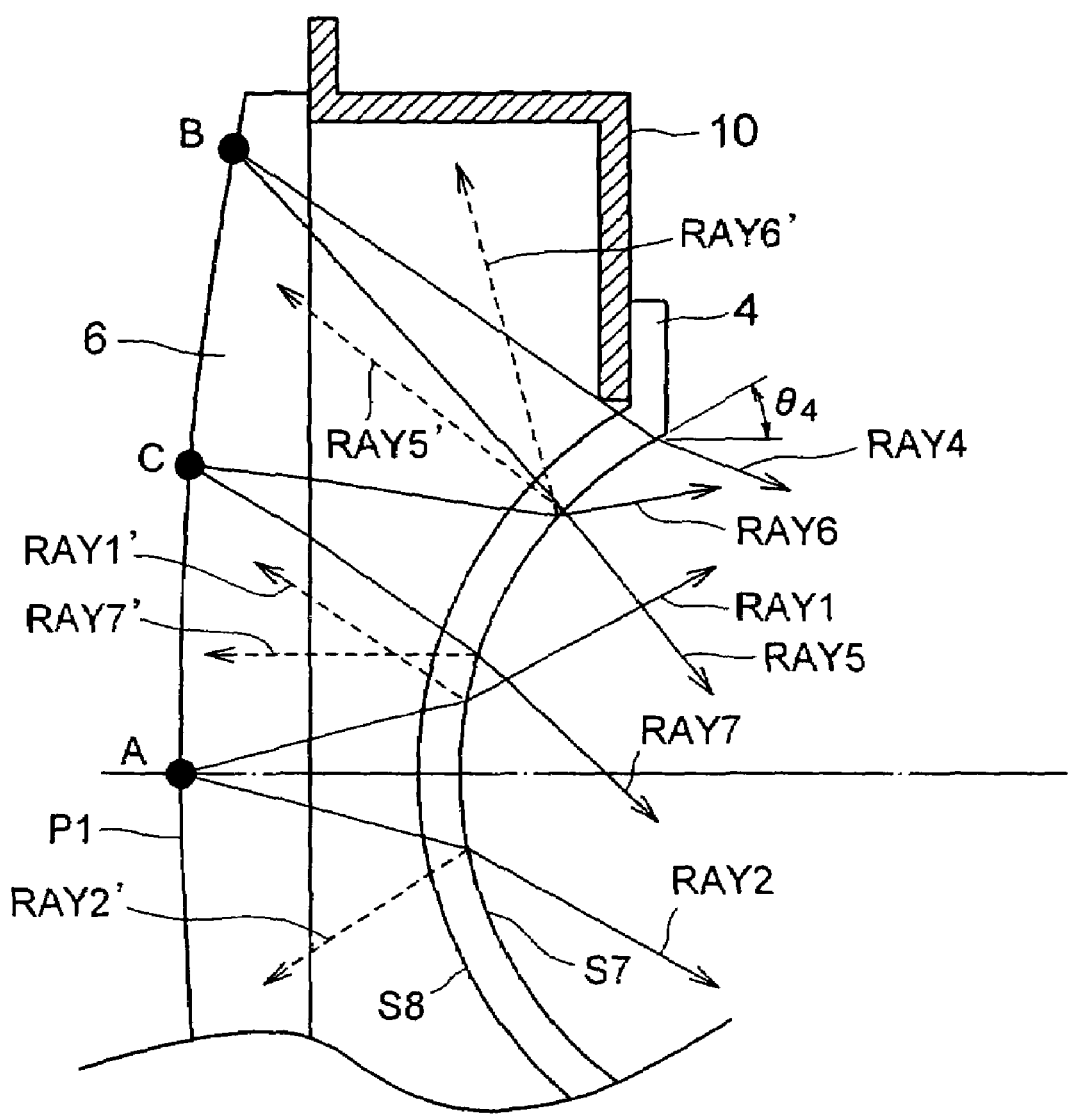
FIG. 15 is a view for explaining light rays which travel from a projection tube to a four-group-four lens unit.

Next, FIG. 15 is a view for explaining a factor which would deteriorate the contrast ratio, and shows, in detail, the components located in the extent from the projection tube to the fourth group lens in the configuration shown in FIG. 1. Like reference numerals are used to denote components like to those shown in FIG. 1.

In this configuration, the light beam having the hedge rays RAY 1 and RAY 2 from the object point A on the optical axis within the original image displayed on the fluorescent surface P1 of the projection tube (cathode ray tube), the light beam having the hedge rays RAY 4 and RAY 5 from the object point B at the outermost peripheral part of the screen, and a light beam having hedge rays RAY 6 and RAY 7 from a object point C in an intermediate zone of the screen are reflected at the emergent surface S7 of the fourth group lens 4 in the above-mentioned configuration. The reflected beams having hedge rays RAY1' and RAY 2', RAY4' and RAY5', and RAY6' and RAY7' come back onto the fluorescent surface P1 of the projection tube (cathode ray tube). At this stage, in such a case that high bright portions and low bright portions (including no light emitting portions) are mingled, should the reflected light beams come back to these low bright portions, the so-called image looseness would occur, resulting in lowering of the contrast ratio. Since the contrast ratio is given by the rate between a high bright portion and a low bright portion in the original image displayed on the fluorescent surface P1 of the projection tube (cathode ray tube), the higher the energy intensity of the reflected light beams having the hedge rays RAY1' and RAY 2', RAY4' and RAY5', and RAY6' and RAY7', the higher the brightness of the low bright portions, the contrast ratio is decreased.

In order to reduce the energy intensity of the reflected light beams coming back onto the fluorescent surface P1 of the projection tube (cathode ray tube), the angle between the upper hedge ray and the lower hedge ray of a reflected light beam (that is, the angle between the hedge rays RAY1' and RAY 2' of the light beam from the object point A, the angle between the hedge rays RAY4' and RAY5' of the light beam from the object point B, or the angle between the hedge rays RAY6' and RAY7' of the light beam from the object point C) has to be increased. The larger the angle between the upper end lower hedge rays of the reflected light beam, the larger the area of the reflected beam irradiated on the fluorescent surface P1 of the projection tube (cathode ray tube). Meanwhile, since the energy intensity of light reflected on the emergent surface S7 of the fourth group lens 4 is constant, the larger the area irradiated by the reflected light on the fluorescent surface P1 of the projection tube (cathode ray tube), the lower the energy intensity of reflected light (the intensity of the reflected light per unit area).

In the embodiment of the present invention, by locating the emergent surface S7 of the fourth group lens 4, far away from the fluorescent surface P1 of the projection tube (cathode ray tube), that is, by increasing the back focus, the angle between the upper hedge ray and the lower hedge ray of a reflected light beam at the emergent surface S7 of the fourth group lens 4 can become larger, and accordingly, the energy intensity of the reflected beam on the fluorescent surface P1 of the projection tube (cathode ray tube) is decreased, thereby it is possible to obtain a high contrast ratio.

However, the longer the back focus, the more difficult the aberration correction. A glass material having a low refractive index has been conventionally used for the power lens. However, the focal distance has had to be shortened in view of a demand of compactness. The plastic lenses other than the power lens have had to bear burden in part. That is, the plastic lenses have been used not only for the purpose of aberration correction but for else. Namely, they have not been able to be used for aberration correction caused by an increase in the distance of the back focus. On the contrary, according to the present invention, the focal distance can be shortened by both using a glass material having a high refractive index and optimizing the configuration of the power lens. That is, aberration caused by an increase in the distance of the back focus can be corrected satisfactorily by optimizing the configurations of the plastic lenses, thereby it is possible to enhance the contrast ratio.

Further, the fourth group lens 4 is incorporated therein with a wavelength selective filter for absorbing light beams other than those having main wavelengths among image beams from the original image. By absorbing spectrum other than main wavelengths of color fluorescence with the use of this filter, the energy intensity of the reflected light can be effectively decreased, and further, chromatic aberration can be restrained from occurring. Although the wavelength selective filter may be incorporated any of the lenses, it is preferably incorporated in the fourth group lens 4 which is nearest to the fluorescence surface P1 of the projection tube as stated above in view of the contrast.

Figure 16:
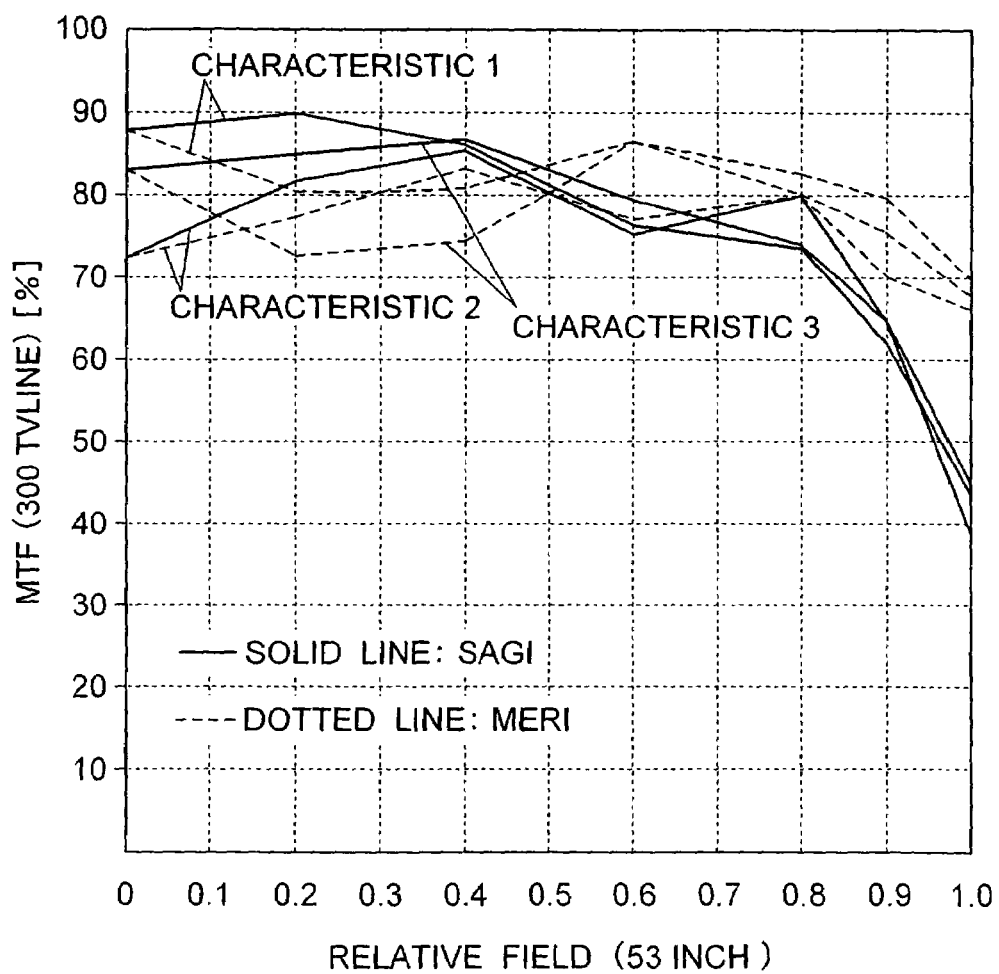
FIG. 16 is a view illustrating a result of evaluation of a focusing performance due to MTF of a projection lens unit according to the present invention.

Next, FIG. 16 shows a result of evaluation of the focusing performance due to an MTF (Modulation Transfer Function) of such a configuration in which an image (raster) having a diagonal size of 5 inches and displayed on a fluorescent surface of a projection tube is magnified and projected on a screen with a diagonal size of 53 inches with the use of the projection lens unit, as stated above, according to the present invention.

In this figure, CHARACTERISTIC 1 denote a characteristic given by lens data exhibited in Table 1, CHARACTERISTIC 2 a characteristic given by lens data exhibited in Table 10, and CHARACTERISTIC 3 a characteristic given by lens data exhibited in Table 13. It is noted that a satisfactory MTF characteristic can be obtained with other lens data in this configuration, similar to those exhibited in FIG. 16. Further, FIG. 16 shows in such a case that as to an evaluation frequency, 300 TV lines are taken as white and black stripe signals on the screen.

Referring to FIG. 17 which is a vertical sectional view illustrating a main part of a rear projection type image display system applied thereto with the projection lens unit according to the present invention, there are shown a screen 11, a fold-back mirror 12, a projection lens unit 13, a projection tube (cathode ray tube) 15 as an image source, a bracket 14 for fixing the projection lens unit 13 to the projection tube 15, a housing 17 of the rear projection type image display system and an imaging beam 16 from the projection lens unit.

In FIG. 17, the imaging beam 16 from the projection tube 15 is folded back by the fold-back mirror 12, and is the projected onto the screen on the rear side of the latter so as to display an image on the screen 11. As stated above, according to the present invention, the following technical effects and advantage can be exhibited:

(1) With the use of a power lens having a highest refractive power, which is made of a glass material having a refractive index in a range from about 1.63 to 1.70, the focal distance can be shortened, and accordingly, the rear projection type image display system can be made to be compact;

(2) With the use of a power lens having a highest refractive power, which is made of a glass material having an Abbe's number of not less 50, chromatic aberration can be reduced, and accordingly, it is possible to prevent the focusing performance from being deteriorated;

(3) With the use of the power lens having a highest refractive power, which has an optimized configuration, satisfactory aberration correction can be made;

(4) With the use of plastic lenses which have optimized aspheric degrees and optimized numbers of inflection points, satisfactory aberration correction can be made; and (5) By locating the emergent surface of the lens element which is arranged nearest to the image source, at a position far from the image source, and by incorporating the wavelength selective filter to the lens element, the energy intensity of the reflected bean from the lens element can be reduced, and accordingly, the image contrast can be enhanced.

Thus, with the use of the projection lens unit according to the present invention, an image with high contrast and high focus can be obtained over the screen in its entirety, and a compact rear projection type image display system can be obtained. Further, with the use of optical glass having a high refractive index for the power lens, compromise between high focus and compactness can be made with a less number of lenses.

As stated above, according to the present invention, there can be provided a projection lens unit which is inexpensive, which has a wide angle of viewing field (short projection distance) while can satisfactorily correct aberration, and which can exhibit a sharp magnified image having a sufficiently high contrast ratio, and a rear projection type image display system using such a projection lens unit.

It should be further understood by those skilled in the art that although the foregoing description has been made on embodiments of the invention, the invention is not limited thereto and various changes and modifications may be made without departing from the spirit of the invention and the scope of the appended claims.

TABLE 1 f = 76.958 mm, Fno = 1.0

| LENS CONFIGURATION | LENS SURFACE | RADIUS OF CURVATURE Rd | SURFACE-TO-SURFACE SPACE TH | ABBE'S NUMBER $v^d$ | REFRACTIVE INDEX nd |
|---|---|---|---|---|---|
| SCREEN | — | INFINITY | 823.0 | — | 1 |
| FIRST LENS | S1 | 69.79931 | 10.0 | 57.9 | 1.4924 |
|  | S2 | 74.93033 | 16.19 |  | 1 |
| SECOND LENS | S3 | 85.88 | 21.0 | 55.5 | 1.63854 |
|  | S4 | −132.99 | 19.55 |  | 1 |
| THIRD LENS | S5 | 866.20836 | 10.0 | 57.9 | 1.4924 |
|  | S6 | −114.58817 | 26.16 |  | 1 |
| FOURTH LENS | S7 | −46.02406 | 4.0 | 57.9 | 1.4924 |
|  | S8 | −48.0 | 11.0 |  | 1.44703 |
| TRANSPARENT COOLANT | | INFINITY | | — | |

TABLE 1-continued

| | | | | | | | |
|---|---|---|---|---|---|---|---|
| MEDIUM CATHODE RAY TUBE | FACE SURFACE FLUORESCENT SURFACE | INFINITY −350 | 14.1 0 | — | | | 1.56232 |

| LENS CONFIGURATION | LENS SURFACE | ASPHERIC COEFFICIENT | | | | | |
|---|---|---|---|---|---|---|---|
| | | K | A | B | C | D | E | F |
| FIRST LENS | S1 | −0.288350 | −2.29220E−06 | −3.41144E−10 | −1.25449E−12 | 1.25958E−15 | −4.14975E−19 | 4.77344E−23 |
| | S2 | 0.121059 | −1.64789E−06 | −4.32770E−10 | −1.03378E−12 | 1.46250E−15 | −5.76082E−19 | 7.87501E−23 |
| THIRD LENS | S5 | −27.782856 | −2.79785E−07 | 2.62596E−09 | −4.87911E−12 | 5.78588E−15 | −3.02092E−18 | 5.81971E−22 |
| | S6 | 0.083101 | 5.26214E−07 | 1.90783E−09 | −3.77159E−12 | 4.84687E−15 | −2.34045E−18 | 3.55012E−22 |
| FOURTH LENS | S7 | 0.379669 | −2.68783E−06 | 5.74255E−09 | −1.01167E−11 | 1.15749E−14 | −6.83332E−18 | 1.69372E−21 |

TABLE 2 f = 75.844 mm, Fno = 1.0

| LENS CONFIGURATION | LENS SURFACE | RADIUS OF CURVATURE Rd | SURFACE-TO-SURFACE SPACE TH | ABBE'S NUMBER $\nu^d$ | REFRACTIVE INDEX nd |
|---|---|---|---|---|---|
| SCREEN | — | INFINITY | 824.689 | — | 1 |
| FIRST LENS | S1 | 59.58379 | 10.0 | 57.9 | 1.4924 |
| | S2 | 64.19743 | 18.034 | | 1 |
| SECOND LENS | S3 | 70.38177 | 21.0 | 55.5 | 1.63854 |
| | S4 | −185.28989 | 20.503 | | 1 |
| THIRD LENS | S5 | 10000 | 10.0 | 57.9 | 1.4924 |
| | S6 | −90.10326 | 21.674 | | 1 |
| FOURTH LENS | S7 | −41.65447 | 4.0 | 57.9 | 1.4924 |
| | S8 | −48.0 | 11.0 | | 1.44703 |
| TRANSPARENT MEDIUM | COOLANT | INFINITY | | — | |
| CATHODE RAY TUBE | FACE SURFACE FLUORESCENT SURFACE | INFINITY −350 | 14.1 0 | — | 1.56232 |

| LENS CON-FIGURATION | LENS SURFACE | ASPHERIC COEFFICIENT | | | | | | |
|---|---|---|---|---|---|---|---|---|
| | | K | A | B | C | D | E | F |
| FIRST LENS | S1 | 0 | −2.04157E−06 | −6.32068E−10 | −1.27713E−12 | 1.19513E−15 | −3.56347E−19 | 3.53940E−23 |
| | S2 | 0 | −1.41323E−06 | −9.90197E−10 | −8.68177E−13 | 1.31781E−15 | −4.70865E−19 | 5.50002E−23 |
| THIRD LENS | S5 | 0 | −2.15943E−06 | 8.89636E−10 | −2.13582E−12 | −5.26838E−16 | 3.02355E−18 | −1.47273E−21 |
| | S6 | 0 | −1.09830E−07 | −3.49335E−09 | 9.71458E−12 | −1.51968E−14 | 1.20380E−17 | −3.63295E−21 |
| FOURTH LENS | S7 | 0 | −9.00147E−07 | 1.93398E−09 | 1.01732E−11 | −1.64261E−14 | 1.28064E−17 | 3.92814E−21 |

TABLE 3 f = 76.582 mm, Fno = 1.0

| LENS CONFIGURATION | LENS SURFACE | RADIUS OF CURVATURE Rd | SURFACE-TO-SURFACE SPACE TH | ABBE'S NUMBER $\nu^d$ | REFRACTIVE INDEX nd |
|---|---|---|---|---|---|
| SCREEN | — | INFINITY | 824.546 | — | 1 |
| FIRST LENS | S1 | 65.38381 | 10.0 | 57.9 | 1.4924 |
| | S2 | 65.70565 | 14.544 | | 1 |
| SECOND LENS | S3 | 85.49324 | 21.0 | 55.5 | 1.63854 |
| | S4 | −122.09699 | 18.525 | | 1 |
| THIRD LENS | S5 | 5768.99036 | 10.0 | 57.9 | 1.4924 |
| | S6 | −102.640237 | 27.284 | | 1 |
| FOURTH LENS | S7 | −43.55408 | 4.0 | 57.9 | 1.4924 |
| | S8 | −48.0 | 11.0 | | 1.44703 |
| TRANSPARENT MEDIUM | COOLANT | INFINITY | | — | |
| CATHODE RAY TUBE | FACE SURFACE FLUORESCENT SURFACE | INFINITY −350 | 14.1 0 | — | 1.56232 |

TABLE 3-continued

| LENS CONFIGURATION | LENS SURFACE | ASPHERIC COEFFICIENT | | | | | | |
|---|---|---|---|---|---|---|---|---|
| | | K | A | B | C | D | E | F |
| FIRST LENS | S1 | −0.10586 | −2.37200E−06 | −1.15773E−09 | −7.65973E−13 | 1.17051E−15 | −4.20825E−19 | 4.96724E−23 |
| | S2 | −0.21304 | −1.45812E−06 | −1.51487E−09 | −9.75086E−15 | 1.01995E−15 | −4.40765E−19 | 5.52690E−23 |
| THIRD LENS | S5 | −20000 | 1.16497E−07 | 2.86433E−09 | −5.05589E−12 | 6.69891E−15 | −3.80763E−18 | 7.62674E−22 |
| | S6 | −11.38698 | 2.38924E−07 | −2.77920E−10 | 3.14076E−12 | −3.58997E−15 | 3.05271E−18 | −1.05844E−21 |
| FOURTH LENS | S7 | 0.25559 | −2.11576E−06 | 4.96652E−09 | −8.14590E−12 | 9.11809E−15 | −5.39547E−18 | 1.40181E−21 |

TABLE 4 f = 77.726 mm, Fno = 1.0

| LENS CONFIGURATION | LENS SURFACE | RADIUS OF CURVATURE Rd | SURFACE-TO-SURFACE SPACE TH | ABBE'S NUMBER $v^d$ | REFRACTIVE INDEX nd |
|---|---|---|---|---|---|
| SCREEN | — | INFINITY | 823.0 | — | 1 |
| FIRST LENS | S1 | 69.36433 | 9.848 | 57.9 | 1.4924 |
| | S2 | 84.52866 | 19.835 | | 1 |
| SECOND LENS | S3 | 85.88366 | 17.473 | 55.5 | 1.63854 |
| | S4 | −160.94030 | 20.594 | | 1 |
| THIRD LENS | S5 | 639.29713 | 10.0 | 57.9 | 1.4924 |
| | S6 | −120.68613 | 25.150 | | 1 |
| FOURTH LENS | S7 | −48.29651 | 4.0 | 57.9 | 1.4924 |
| | S8 | −48.0 | 11.0 | | 1.44703 |
| TRANSPARENT MEDIUM | COOLANT | INFINITY | | | |
| CATHODE RAY TUBE | FACE SURFACE | INFINITY | 14.1 | — | 1.56232 |
| | FLUORESCENT SURFACE | −350 | 0 | | |

| LENS CONFIGURATION | LENS SURFACE | ASPHERIC COEFFICIENT | | | | | | |
|---|---|---|---|---|---|---|---|---|
| | | K | A | B | C | D | E | F |
| FIRST LENS | S1 | −0.16915 | −1.72046E−06 | −5.17533E−10 | −1.37848E−12 | 1.28913E−15 | −3.95781E−19 | 4.25018E−23 |
| | S2 | 0.31806 | −1.15897E−06 | −6.77104E−10 | −1.15732E−12 | 1.47995E−15 | −5.50126E−19 | 7.18987E−23 |
| THIRD LENS | S5 | −912.23366 | 3.96551E−07 | 2.48809E−09 | −5.05757E−12 | 5.88557E−15 | −2.90458E−18 | 5.00918E−22 |
| | S6 | 2.65563 | −1.13871E−08 | 2.75415E−09 | −4.75928E−12 | −5.04957E−15 | −1.96374E−18 | 1.55962E−22 |
| FOURTH LENS | S7 | 0.522373 | −2.62439E−06 | 5.64358E−09 | −1.01206E−11 | 1.17011E−14 | −6.83782E−18 | 1.67793E−21 |

TABLE 5 f = 77.356 mm, Fno = 1.0

| LENS CONFIGURATION | LENS SURFACE | RADIUS OF CURVATURE Rd | SURFACE-TO-SURFACE SPACE TH | ABBE'S NUMBER $v^d$ | REFRACTIVE INDEX nd |
|---|---|---|---|---|---|
| SCREEN | — | INFINITY | 823.0 | — | 1 |
| FIRST LENS | S1 | 67.61594 | 9.983 | 57.9 | 1.4924 |
| | S2 | 77.46543 | 19.0 | | 1 |
| SECOND LENS | S3 | 83.61880 | 18.005 | 55.5 | 1.63854 |
| | S4 | −156.09293 | 20.550 | | 1 |
| THIRD LENS | S5 | 713.86094 | 10.0 | 57.9 | 1.4924 |
| | S6 | −116.57155 | 25.362 | | 1 |
| FOURTH LENS | S7 | −47.37637 | 4.0 | 57.9 | 1.4924 |
| | S8 | −48 | 11.0 | | 1.44703 |
| TRANSPARENT MEDIUM | COOLANT | INFINITY | | | |
| CATHODE RAY TUBE | FACE SURFACE | INFINITY | 14.1 | — | 1.56232 |
| | FLUORESCENT SURFACE | −350 | 0 | | |

TABLE 5-continued

| LENS CONFIGURATION | LENS SURFACE | ASPHERIC COEFFICIENT | | | | | | |
|---|---|---|---|---|---|---|---|---|
| | | K | A | B | C | D | E | F |
| FIRST LENS | S1 | −0.20303 | −1.87600E−06 | −4.8332E−10 | −1.34664E−12 | 1.2820E−15 | −4.00134E−19 | 4.36110E−23 |
| | S2 | 0.21137 | −1.28759E−06 | −6.91319E−10 | −1.09556E−12 | 1.48352E−15 | −5.63964E−19 | 7.49290E−23 |
| THIRD LENS | S5 | −1275.86126 | −3.65679E−07 | 2.49698E−09 | −4.99222E−12 | 5.91020E−15 | −2.94056E−18 | 5.03995E−22 |
| | S6 | 1.74988 | 1.84853E−07 | 2.50855E−09 | −4.42360E−12 | 5.04515E−15 | −2.07342E−18 | 1.99911E−22 |
| FOURTH LENS | S7 | 0.45001 | −2.69458E−06 | 6.04323E−09 | −1.03667E−11 | 1.18304E−14 | −6.92853E−18 | 1.70731E−21 |

TABLE 6 f = 75.783 mm, Fno = 1.0

| LENS CONFIGURATION | LENS SURFACE | RADIUS OF CURVATURE Rd | SURFACE-TO-SURFACE SPACE TH | ABBE'S NUMBER $v^d$ | REFRACTIVE INDEX nd |
|---|---|---|---|---|---|
| SCREEN | — | INFINITY | 825.539 | — | 1 |
| FIRST LENS | S1 | 58.90687 | 10.0 | 57.9 | 1.4924 |
| | S2 | 64.336561 | 17.911 | | 1 |
| SECOND LENS | S3 | 68.994856 | 21.0 | 55.5 | 1.63854 |
| | S4 | −191.74828 | 20.753 | | 1 |
| THIRD LENS | S5 | 10000 | 10.0 | 57.9 | 1.4924 |
| | S6 | −90.59503 | 20.697 | | 1 |
| FOURTH LENS | S7 | −40.53246 | 4.0 | 57.9 | 1.4924 |
| | S8 | −48.0 | 11.0 | | 1.44703 |
| TRANSPARENT MEDIUM | COOLANT | INFINITY | | — | |
| CATHODE RAY TUBE | FACE SURFACE | INFINITY | 14.1 | — | 1.56232 |
| | FLUORESCENT SURFACE | −350 | 0 | | |

| LENS CONFIGURATION | LENS SURFACE | ASPHERIC COEFFICIENT | | | | | | |
|---|---|---|---|---|---|---|---|---|
| | | K | A | B | C | D | E | F |
| FIRST LENS | S1 | 0 | −1.88548E−06 | −1.28907E−09 | −5.38022E−13 | 7.29928E−16 | −2.06477E−19 | 1.66216E−23 |
| | S2 | 0 | −1.29217E−06 | −1.90156E−09 | 5.53302E−13 | 1.50660E−16 | −2.18894E−21 | −1.58399E−23 |
| THIRD LENS | S5 | 0 | −3.93711E−06 | 4.44711E−09 | −9.43034E−12 | 6.86339E−15 | −1.39063E−18 | −8.72315E−22 |
| | S6 | 0 | −2.28682E−06 | 2.03350E−09 | −2.65524E−12 | −2.04995E−16 | 2.18008E−18 | −8.32159E−22 |
| FOURTH LENS | S7 | 0 | −1.28879E−06 | −1.33938E−09 | 1.04784E−11 | −1.68694E−14 | 1.29619E−17 | −3.92814E−21 |

TABLE 7 f = 75.773 mm, Fno = 1.0

| LENS CONFIGURATION | LENS SURFACE | RADIUS OF CURVATURE Rd | SURFACE-TO-SURFACE SPACE TH | ABBE'S NUMBER $v^d$ | REFRACTIVE INDEX nd |
|---|---|---|---|---|---|
| SCREEN | — | INFINITY | 824.941 | — | 1 |
| FIRST LENS | S1 | 59.03669 | 10.0 | 57.9 | 1.4924 |
| | S2 | 65.02585 | 18.853 | | 1 |
| SECOND LENS | S3 | 67.91968 | 21.0 | 55.5 | 1.63854 |
| | S4 | −204.34371 | 20.545 | | 1 |
| THIRD LENS | S5 | 10000 | 10.0 | 57.9 | 1.4924 |
| | S6 | −89.39302 | 20.561 | | 1 |
| FOURTH LENS | S7 | −40.121134 | 4.0 | 57.9 | 1.4924 |
| | S8 | −48.0 | 11.0 | | 1.44703 |
| TRANSPARENT MEDIUM | COOLANT | INFINITY | | — | |
| CATHODE RAY TUBE | FACE SURFACE | INFINITY | 14.1 | — | 1.56232 |
| | FLUORESCENT SURFACE | −350 | 0 | | |

TABLE 7-continued

| LENS CONFIGURATION | LENS SURFACE | ASPHERIC COEFFICIENT | | | | | |
|---|---|---|---|---|---|---|---|
| | | K | A | B | C | D | E | F |
| FIRST LENS | S1 | 0 | −1.73851E−06 | −1.20779E−09 | −5.65540E−13 | 7.10477E−16 | −1.98322E−19 | 1.59892E−23 |
| | S2 | 0 | −1.09527E−06 | −1.9225E−09 | 5.88550E−13 | 1.20483E−16 | −5.03837E−21 | −1.26058E−23 |
| THIRD LENS | S5 | 0 | −3.71048E−06 | 3.20240E−09 | −7.26977E−12 | 5.01325E−15 | −7.73451E−19 | −8.72315E−23 |
| | S6 | 0 | −2.00018E−06 | 1.09180E−09 | −1.34477E−12 | −1.11872E−16 | 2.43149E−18 | −8.32159E−22 |
| FOURTH LENS | S7 | 0 | −1.18855E−06 | 1.43012E−10 | 7.04742E−12 | −1.37410E−14 | 1.19383E−17 | −3.92814E−21 |

TABLE 8 f = 76.000 mm, Fno = 1.0

| LENS CONFIGURATION | LENS SURFACE | RADIUS OF CURVATURE Rd | SURFACE-TO-SURFACE SPACE TH | ABBE'S NUMBER $v^d$ | REFRACTIVE INDEX nd |
|---|---|---|---|---|---|
| SCREEN | — | INFINITY | 822.885 | — | 1 |
| FIRST LENS | S1 | 68.89862 | 9.56866 | 57.9 | 1.4924 |
| | S2 | 75.57969 | 18.66976 | | 1 |
| SECOND LENS | S3 | 82.39850 | 20.45727 | 55.5 | 1.63854 |
| | S4 | −143.32076 | 15.86893 | | 1 |
| THIRD LENS | S5 | 10000 | 10.0 | 57.9 | 1.4924 |
| | S6 | −107.14052 | 28.45018 | | 1 |
| FOURTH LENS | S7 | −48.16377 | 4.0 | 57.9 | 1.4924 |
| | S8 | −48.0 | 11.0 | | 1.44703 |
| TRANSPARENT MEDIUM | COOLANT | INFINITY | | — | |
| CATHODE RAY TUBE | FACE SURFACE | INFINITY | 14.1 | — | 1.56232 |
| | FLUORESCENT SURFACE | −350 | 0 | | |

| LENS CONFIGURATION | LENS SURFACE | ASPHERIC COEFFICIENT | | | | | |
|---|---|---|---|---|---|---|---|
| | | K | A | B | C | D | E | F |
| FIRST LENS | S1 | 0 | −1.88683E−06 | −1.43645E−10 | −1.45558E−12 | 1.26095E−15 | −3.89841E−19 | 4.28783E−23 |
| | S2 | 0 | −9.49216E−07 | −9.19698E−11 | −1.50485E−12 | 1.66623E−15 | −6.09460E−19 | 8.23655E−23 |
| THIRD LENS | S5 | 0 | −1.22624E−07 | 2.69381E−09 | −4.27063E−12 | 6.51457E−15 | −4.32392E−18 | 1.10453E−21 |
| | S6 | 0 | 1.22300E−06 | 8.83505E−10 | −1.56984E−13 | 1.769924E−15 | −1.35311E−18 | 4.11668E−22 |
| FOURTH LENS | S7 | 0 | −1.33714E−06 | −7.46453E−09 | 1.94822E−11 | −2.45696E−14 | 1.53459E−17 | −3.92814E−21 |

TABLE 9 f = 75.981 mm, Fno = 1.0

| LENS CONFIGURATION | LENS SURFACE | RADIUS OF CURVATURE Rd | SURFACE-TO-SURFACE SPACE TH | ABBE'S NUMBER $v^d$ | REFRACTIVE INDEX nd |
|---|---|---|---|---|---|
| SCREEN | — | INFINITY | 822.679 | — | 1 |
| FIRST LENS | S1 | 69.70045 | 9.460 | 57.9 | 1.4924 |
| | S2 | 76.17010 | 18.447 | | 1 |
| SECOND LENS | S3 | 83.11039 | 21.0 | 55.5 | 1.63854 |
| | S4 | −139.91167 | 15.804 | | 1 |
| THIRD LENS | S5 | 10000 | 10.0 | 57.9 | 1.4924 |
| | S6 | −107.38104 | 28.511 | | 1 |
| FOURTH LENS | S7 | −48.15813 | 4.0 | 57.9 | 1.4924 |
| | S8 | −48.0 | 11.0 | | 1.44703 |
| TRANSPARENT MEDIUM | COOLANT | INFINITY | | — | |
| CATHODE RAY TUBE | FACE SURFACE | INFINITY | 14.1 | — | 1.56232 |
| | FLUORESCENT SURFACE | −350 | 0 | | |

TABLE 9-continued

| LENS CONFIGURATION | LENS SURFACE | ASPHERIC COEFFICIENT | | | | | |
|---|---|---|---|---|---|---|---|
| | | K | A | B | C | D | E | F |
| FIRST LENS | S1 | 0 | −1.93113E−06 | −1.00289E−10 | −1.45287E−12 | 1.26367E−15 | −3.96174E−19 | 4.44449E−23 |
| | S2 | 0 | −9.83156E−07 | −1.38697E−11 | −1.53541E−12 | 1.69202E−15 | −6.26769E−19 | 8.61412E−23 |
| THIRD LENS | S5 | 0 | −1.70520E−07 | 2.68567E−09 | −4.27370E−12 | 6.48815E−15 | −4.31749E−18 | 1.11524E−21 |
| | S6 | 0 | 1.24269E−06 | 8.48281E−10 | −1.60356E−13 | 1.78831E−15 | −1.41907E−18 | 4.50644E−22 |
| FOURTH LENS | S7 | 0 | −1.54292E−06 | −6.96456E−09 | 1.87135E−11 | −2.39998E−14 | 1.51723E−17 | −3.92814E−21 |

TABLE 10 f = 76.835 mm, Fno = 1.0

| LENS CONFIGURATION | LENS SURFACE | RADIUS OF CURVATURE Rd | SURFACE-TO-SURFACE SPACE TH | ABBE'S NUMBER $v^d$ | REFRACTIVE INDEX nd |
|---|---|---|---|---|---|
| SCREEN | — | INFINITY | 821.095 | — | 1 |
| FIRST LENS | S1 | 63.09248 | 10.0 | 57.9 | 1.4924 |
| | S2 | 67.67405 | 20.603 | | 1 |
| SECOND LENS | S3 | 68.46838 | 21.0 | 55.5 | 1.63854 |
| | S4 | −217.94502 | 21.183 | | 1 |
| THIRD LENS | S5 | 1120.79559 | 10.0 | 57.9 | 1.4924 |
| | S6 | −95.10383 | 22.019 | | 1 |
| FOURTH LENS | S7 | −41.52404 | 4.0 | 57.9 | 1.4924 |
| | S8 | −48.0 | 11.0 | | 1.44703 |
| TRANSPARENT MEDIUM | COOLANT | INFINITY | | — | |
| CATHODE RAY TUBE | FACE SURFACE | INFINITY | 14.1 | — | 1.56232 |
| | FLUORESCENT SURFACE | −350 | 0 | | |

| LENS CONFIGURATION | LENS SURFACE | ASPHERIC COEFFICIENT | | | | | |
|---|---|---|---|---|---|---|---|
| | | K | A | B | C | D | E | F |
| FIRST LENS | S1 | 0 | −1.72407E−06 | −8.29566E−10 | −5.27136E−13 | 6.35176E−16 | −1.90008E−19 | 1.83339E−23 |
| | S2 | 0 | −1.12673E−06 | −1.43535E−03 | 4.24553E−13 | 2.06816E−16 | −8.03635E−20 | 6.72506E−24 |
| THIRD LENS | S5 | 0 | −2.16862E−06 | 1.19052E−09 | −3.99288E−12 | 3.61660E−15 | −9.44617E−19 | 8.31606E−23 |
| | S6 | 0 | 3.83459E−07 | −4.60647E−09 | −1.02082E−11 | −1.32747E−14 | −9.39320E−18 | 2.40530E−21 |
| FOURTH LENS | S7 | 0 | −2.44733E−06 | −9.83161E−09 | 1.737118E−11 | 1.79001E−14 | −9.09939E−17 | 1.81788E−21 |

TABLE 11 f = 76.874 mm, Fno = 1.0

| LENS CONFIGURATION | LENS SURFACE | RADIUS OF CURVATURE Rd | SURFACE-TO-SURFACE SPACE TH | ABBE'S NUMBER $v^d$ | REFRACTIVE INDEX nd |
|---|---|---|---|---|---|
| SCREEN | — | INFINITY | 824.11155 | — | 1 |
| FIRST LENS | S1 | 72.82050 | 10.0 | 57.9 | 1.4924 |
| | S2 | 84.84287 | 15.618 | | 1 |
| SECOND LENS | S3 | 96.89080 | 21.0 | 55.5 | 1.63854 |
| | S4 | −114.72139 | 18.123 | | 1 |
| THIRD LENS | S5 | 1664.10874 | 10.0 | 57.9 | 1.4924 |
| | S6 | −122.31067 | 27.047 | | 1 |
| FOURTH LENS | S7 | −46.46996 | 4.0 | 57.9 | 1.4924 |
| | S8 | −48.0 | 11.0 | | 1.44703 |
| TRANSPARENT MEDIUM | COOLANT | INFINITY | | — | |
| CATHODE RAY TUBE | FACE SURFACE | INFINITY | 14.1 | — | 1.56232 |
| | FLUORESCENT SURFACE | −350 | 0 | | |

TABLE 11-continued

| LENS CONFIGURATION | LENS SURFACE | ASPHERIC COEFFICIENT | | | | | | |
|---|---|---|---|---|---|---|---|---|
| | | K | A | B | C | D | E | F |
| FIRST LENS | S1 | −0.03084 | −2.30780E−06 | −5.65470E−10 | −1.13443E−12 | 1.14890E−15 | −3.56692E−19 | 3.71635E−23 |
| | S2 | 0.14197 | −1.41969E−06 | −9.83540E−10 | −2.87599E−13 | 8.57803E−16 | −3.23442E−19 | 3.79058E−23 |
| THIRD LENS | S5 | 583.35041 | −4.03295E−07 | 4.43575E−09 | −7.60814E−12 | 7.62677E−15 | −3.55285E−18 | 6.30306E−22 |
| | S6 | −3.27856 | 5.84333E−07 | 1.75035E−10 | 2.02981E−12 | 3.89915E−15 | 3.50186E−18 | −1.10805E−21 |
| FOURTH LENS | S7 | 0.42664 | −2.40941E−06 | 4.4896E−09 | −9.57980E−12 | 1.16498E−14 | −6.91473E−18 | 1.65962E−21 |

TABLE 12 f = 77.320 mm, Fno = 1.0

| LENS CONFIGURATION | LENS SURFACE | RADIUS OF CURVATURE Rd | SURFACE-TO-SURFACE SPACE TH | ABBE'S NUMBER $v^d$ | REFRACTIVE INDEX nd |
|---|---|---|---|---|---|
| SCREEN | — | INFINITY | 823.0 | — | 1 |
| FIRST LENS | S1 | 67.881 | 9.751 | 57.9 | 1.4924 |
| | S2 | 74.956 | 16.972 | | 1 |
| SECOND LENS | S3 | 75.194 | 19.829 | 61.3 | 1.58913 |
| | S4 | −148.330 | 19.817 | | 1 |
| THIRD LENS | S5 | 520.371 | 10.0 | 57.9 | 1.4924 |
| | S6 | −112.086 | 25.298 | | 1 |
| FOURTH LENS | S7 | −43.962 | 4.0 | 57.9 | 1.4924 |
| | S8 | −48.0 | 11.0 | | 1.44703 |
| TRANSPARENT MEDIUM | COOLANT | INFINITY | | — | |
| CATHODE RAY TUBE | FACE SURFACE FLUORESCENT SURFACE | INFINITY −350 | 14.1 0 | — | 1.56232 |

| LENS CONFIGURATION | LENS SURFACE | ASPHERIC COEFFICIENT | | | | | | |
|---|---|---|---|---|---|---|---|---|
| | | K | A | B | C | D | E | F |
| FIRST LENS | S1 | −0.189136 | −2.16207E−06 | −3.45389E−10 | −1.25756E−12 | 1.25983E−15 | −4.14829E−19 | 4.76426E−23 |
| | S2 | 0.13786 | −1.65264E−06 | −4.07473E−10 | −1.03846E−12 | 1.45741E−15 | −5.76785E−19 | 8.01177E−23 |
| THIRD LENS | S5 | −390.80280 | −5.03461E−07 | 2.37108E−09 | −5.04095E−12 | 5.74957E−15 | −2.99502E−18 | 6.11817E−22 |
| | S6 | 2.02770 | 2.48155E−07 | 1.95105E−09 | −3.90304E−12 | 4.73166E−15 | 2.35781E−18 | 4.58895E−22 |
| FOURTH LENS | S7 | 0.228378 | −2.63803E−06 | 5.74554E−09 | −9.94864E−12 | 1.15146E−14 | −6.87440E−18 | 1.72729E−21 |

TABLE 13 f = 77.207 mm, Fno = 1.0

| LENS CONFIGURATION | LENS SURFACE | RADIUS OF CURVATURE Rd | SURFACE-TO-SURFACE SPACE TH | ABBE'S NUMBER $v^d$ | REFRACTIVE INDEX nd |
|---|---|---|---|---|---|
| SCREEN | — | INFINITY | 823.0 | — | 1 |
| FIRST LENS | S1 | 68.79210 | 10.0 | 57.9 | 1.4924 |
| | S2 | 73.34075 | 16.185 | | 1 |
| SECOND LENS | S3 | 81.36278 | 21.0 | 60.3 | 1.62041 |
| | S4 | −137.765803 | 19.554 | | 1 |
| THIRD LENS | S5 | 642.02831 | 10.0 | 57.9 | 1.4924 |
| | S6 | −14.44408 | 25.968 | | 1 |
| FOURTH LENS | S7 | −45.388146 | 4.0 | 57.9 | 1.4924 |
| | S8 | −48.0 | 11.0 | | 1.44703 |
| TRANSPARENT MEDIUM | COOLANT | INFINITY | | — | |
| CATHODE RAY TUBE | FACE SURFACE FLUORESCENT SURFACE | INFINITY −350 | 14.1 0 | — | 1.56232 |

| LENS CONFIGURATION | LENS SURFACE | ASPHERIC COEFFICIENT | | | | | | |
|---|---|---|---|---|---|---|---|---|
| | | K | A | B | C | D | E | F |
| FIRST LENS | S1 | −0.221701 | −2.22026E−06 | −3.33956E−10 | −1.26032E−12 | 1.25810E−15 | −4.14902E−19 | 4.78591E−23 |
| | S2 | 0.13726 | −1.65278E−06 | −4.35948E−10 | −1.03743E−12 | 1.46184E−15 | −5.76319E−19 | 7.90233E−23 |
| THIRD LENS | S5 | −270.98762 | −3.11225E−07 | 2.601129E−09 | −4.92486E−12 | 5.78031E−15 | −3.00979E−18 | 5.82020E−22 |
| | S6 | 0.70378 | 4.44099E−07 | 1.95895E−09 | −3.79741E−12 | 4.82669E−15 | −2.34252E−18 | 3.77123E−22 |
| FOURTH LENS | S7 | 0.32974 | −2.66319E−06 | 5.79369E−09 | −1.01095E−11 | 1.15718E−14 | −6.83044E−18 | 1.697312E−21 |

TABLE 14 f = 77.200 mm, Fno = 1.0

| LENS CONFIGURATION | LENS SURFACE | RADIUS OF CURVATURE Rd | SURFACE-TO-SURFACE SPACE TH | ABBE'S NUMBER $\nu^d$ | REFRACTIVE INDEX nd |
|---|---|---|---|---|---|
| SCREEN | — | INFINITY | 823.0 | — | 1 |
| FIRST LENS | S1 | 68.82122 | 10.0 | 57.9 | 1.4924 |
|  | S2 | 73.25934 | 16.235 |  | 1 |
| SECOND LENS | S3 | 81.70539 | 21.0 | 58.1 | 1.62299 |
|  | S4 | −137.91933 | 19.578 |  | 1 |
| THIRD LENS | S5 | 650.10571 | 10.0 | 57.9 | 1.4924 |
|  | S6 | −114.73019 | 25.992 |  | 1 |
| FOURTH LENS | S7 | −45.53026 | 4.0 | 57.9 | 1.4924 |
|  | S8 | −48.0 | 11.0 |  | 1.44703 |
| TRANSPARENT MEDIUM | COOLANT | INFINITY |  | — |  |
| CATHODE RAY TUBE | FACE SURFACE | INFINITY | 14.1 | — | 1.56232 |
|  | FLUORESCENT SURFACE | −350 | 0 |  |  |

| LENS CONFIGURATION | LENS SURFACE | ASPHERIC COEFFICIENT |||||||
|---|---|---|---|---|---|---|---|---|
|  |  | K | A | B | C | D | E | F |
| FIRST LENS | S1 | −0.22505 | −2.22486E−06 | −3.39417E−10 | −1.26017E−12 | 1.25816E−15 | −4.14870E−19 | 4.78451E−23 |
|  | S2 | 0.13278 | −1.62970E−06 | −4.38641E−10 | −1.03722E−12 | 1.46215E−15 | −5.76309E−19 | 7.89725E−23 |
| THIRD LENS | S5 | −254.88620 | −3.08716E−07 | 2.61137E−09 | −4.9182E−12 | 5.78179E−15 | −3.01098E−18 | 5.80876E−22 |
|  | S6 | 0.61977 | 4.53613E−07 | 1.96052E−09 | −3.79058E−12 | 4.83113E−15 | −2.34188E−18 | 3.73978E−22 |
| FOURTH LENS | S7 | 0.33742 | −2.67060E−06 | 5.80843E−09 | −1.01241E−11 | 1.15773E−14 | −6.82782E−18 | 1.69450E−21 |

TABLE 15 f = 77.112 mm, Fno = 1.0

| LENS CONFIGURATION | LENS SURFACE | RADIUS OF CURVATURE Rd | SURFACE-TO-SURFACE SPACE TH | ABBE'S NUMBER $\nu^d$ | REFRACTIVE INDEX nd |
|---|---|---|---|---|---|
| SCREEN | — | INFINITY | 823.0 | — | 1 |
| FIRST LENS | S1 | 69.89511 | 10.0 | 57.9 | 1.4924 |
|  | S2 | 74.80380 | 16.232 |  | 1 |
| SECOND LENS | S3 | 87.58266 | 21.0 | 50.9 | 1.65844 |
|  | S4 | −137.02028 | 19.849 |  | 1 |
| THIRD LENS | S5 | 1174.36576 | 9.887 | 57.9 | 1.4924 |
|  | S6 | −114.28370 | 25.932 |  | 1 |
| FOURTH LENS | S7 | −46.35821 | 4.0 | 57.9 | 1.4924 |
|  | S8 | −48.0 | 11.0 |  | 1.44703 |
| TRANSPARENT MEDIUM | COOLANT | INFINITY |  | — |  |
| CATHODE RAY TUBE | FACE SURFACE | INFINITY | 14.1 | — | 1.56232 |
|  | FLUORESCENT SURFACE | −350 | 0 |  |  |

| LENS CONFIGURATION | LENS SURFACE | ASPHERIC COEFFICIENT |||||||
|---|---|---|---|---|---|---|---|---|
|  |  | K | A | B | C | D | E | F |
| FIRST LENS | S1 | −0.35355 | −2.34664E−06 | −3.45051E−10 | −1.25117E−12 | 1.26199E−15 | −4.14425E−19 | 4.73973E−23 |
|  | S2 | 0.02242 | −1.70729E−06 | −4.51256E−10 | −1.02975E−12 | 1.46533E−15 | −5.75860E−19 | 7.82789E−23 |
| THIRD LENS | S5 | −752.80592 | −3.11737E−07 | 2.65890E−09 | −4.85909E−12 | 5.79319E−15 | −3.02007E−18 | 5.80055E−22 |
|  | S6 | 0.38755 | 4.73545E−07 | 1.98801E−09 | −3.74867E−12 | 4.84835E−15 | −2.34096E−18 | 3.63324E−22 |
| FOURTH LENS | S7 | 0.37049 | −2.06064E−06 | 5.07777E−09 | −1.00100E−11 | 1.17376E−14 | −6.81276E−18 | 1.62232E−21 |

TABLE 16

ALLOCATION OF LENS POWER

| LENS NO. | $f_0/f_1$ | $f_0/f_2$ | $f_0/f_3$ | $f_0/f_4$ | $1/P_2$ |
|---|---|---|---|---|---|
| 1 | 0.061 | 0.910 | 0.373 | −0.601 | 52.182 |
| 2 | 0.077 | 0.923 | 0.418 | −0.675 | 51.007 |
| 3 | 0.032 | 0.938 | 0.373 | −0.643 | 50.284 |
| 4 | 0.120 | 0.865 | 0.375 | −0.570 | 56.000 |
| 5 | 0.096 | 0.884 | 0.379 | −0.582 | 54.45 |

TABLE 16-continued

ALLOCATION OF LENS POWER

| LENS NO. | $f_0/f_1$ | $f_0/f_2$ | $f_0/f_3$ | $f_0/f_4$ | $1/P_2$ |
|---|---|---|---|---|---|
| 6 | 0.086 | 0.928 | 0.415 | −0.698 | 50.738 |
| 7 | 0.090 | 0.924 | 0.421 | −0.707 | 50.976 |
| 8 | 0.071 | 0.898 | 0.353 | −0.559 | 52.319 |
| 9 | 0.068 | 0.900 | 0.352 | −0.559 | 52.139 |
| 10 | 0.070 | 0.919 | 0.430 | −0.687 | 52.101 |

TABLE 16-continued

ALLOCATION OF LENS POWER

| LENS NO. | $f_0/f_1$ | $f_0/f_2$ | $f_0/f_3$ | $f_0/f_4$ | $1/P_2$ |
|---|---|---|---|---|---|
| 11 | 0.094 | 0.902 | 0.332 | −0.593 | 52.527 |
| 12 | 0.077 | 0.886 | 0.411 | −0.642 | 49.899 |
| 13 | 0.059 | 0.905 | 0.390 | −0.614 | 51.153 |
| 14 | 0.058 | 0.906 | 0.388 | −0.612 | 51.309 |
| 15 | 0.060 | 0.919 | 0.364 | −0.597 | 53.430 |

$f_0$: a focal distance (mm) of an entire lens system
$f_1$: a focal distance (mm) of a first lens group
$f_2$: a focal distance (mm) of a second lens group
$f_3$: a focal distance (mm) of a third lens group
$f_4$: a focal distance (mm) of a fourth lens group

TABLE 17

S1

| LENS NO. | NUMBER OF INFECTION POINTS (WITHIN EFFECTIVE RADIUS) | $A_{s1}$ (mm) | $S_{s1}$ (mm) | $A_{s1}/S_{s1}$ | EFFECTIVE RADIUS (mm) |
|---|---|---|---|---|---|
| 1 | 1 | −3.253 | −16.954 | 0.192 | 45.60 |
| 2 | 1 | −6.184 | −24.627 | 0.251 | 49.37 |
| 3 | 1 | −3.312 | −17.371 | 0.191 | 44.38 |
| 4 | 1 | −3.484 | −19.514 | 0.179 | 45.60 |
| 5 | 1 | −3.799 | −20.023 | 0.190 | 45.60 |
| 6 | 1 | −5.790 | −28.394 | 0.204 | 50.39 |
| 7 | 1 | −6.490 | −28.675 | 0.226 | 50.63 |
| 8 | 1 | −5.470 | −15.744 | 0.347 | 43.84 |
| 9 | 1 | −5.327 | −15.465 | 0.344 | 43.78 |
| 10 | 2 | −7.093 | −29.191 | 0.243 | 53.21 |
| 11 | 1 | −2.250 | −14.927 | 0.151 | 44.17 |
| 12 | 1 | −4.402 | −18.506 | 0.238 | 45.60 |
| 13 | 1 | −3.824 | −17.579 | 0.218 | 45.60 |
| 14 | 1 | −3.78368 | −17.6132 | 0.214821 | 45.60 |
| 15 | 1 | −2.817 | −17.404 | 0.162 | 45.60 |

TABLE 18

S2

| LENS NO. | NUMBER OF INFECTION POINTS (WITHIN EFFECTIVE RADIUS) | $A_{s2}$ (mm) | $S_{s2}$ (mm) | $A_{s2}/S_{s2}$ | EFFECTIVE RADIUS (mm) |
|---|---|---|---|---|---|
| 1 | 2 | −7.196 | −12.594 | 0.571 | 41.58 |
| 2 | 2 | −9.304 | −17.181 | 0.542 | 44.28 |
| 3 | 2 | −8.176 | −13.910 | 0.578 | 40.43 |
| 4 | 2 | −5.865 | −12.515 | 0.469 | 41.58 |
| 5 | 2 | −6.991 | −13.474 | 0.519 | 41.58 |
| 6 | 2 | −9.445 | −18.576 | 0.508 | 45.22 |
| 7 | 2 | −9.719 | −18.488 | 0.526 | 45.42 |
| 8 | 0 | −8.216 | −11.416 | 0.720 | 39.94 |
| 9 | 0 | −8.206 | −11.284 | 0.727 | 39.90 |
| 10 | 2 | −11.376 | −18.964 | 0.600 | 46.98 |
| 11 | 2 | −5.815 | −10.720 | 0.542 | 41.28 |
| 12 | 2 | −7.364 | −12.803 | 0.575 | 41.58 |
| 13 | 2 | −7.535 | −12.851 | 0.586 | 41.58 |
| 14 | 2 | −7.552 | −12.910 | 0.585 | 41.58 |
| 15 | 2 | −7.074 | −13.038 | 0.543 | 41.58 |

TABLE 19

S5

| LENS NO. | NUMBER OF INFECTION POINTS (WITHIN EFFECTIVE RADIUS) | $A_{s5}$ (mm) | $S_{s5}$ (mm) | $A_{s5}/S_{s5}$ | EFFECTIVE RADIUS (mm) |
|---|---|---|---|---|---|
| 1 | 0 | −2.027 | −0.675 | 3.002 | 34.19 |
| 2 | 0 | 3.004 | −0.056 | −53.451 | 33.53 |
| 3 | 0 | −2.758 | −0.104 | 26.509 | 34.65 |
| 4 | 0 | −1.482 | −0.898 | 1.650 | 34.19 |
| 5 | 0 | −1.531 | −0.802 | 1.910 | 34.19 |
| 6 | 0 | 4.302 | −0.056 | −76.958 | 33.44 |
| 7 | 0 | 4.508 | −0.057 | −79.634 | 33.65 |
| 8 | 0 | −3.992 | −0.0638 | 62.583 | 35.72 |
| 9 | 0 | −4.075 | −0.064 | 63.723 | 35.76 |
| 10 | 1 | 2.018 | −0.481 | −4.194 | 32.84 |
| 11 | 0 | −2.441 | −0.367 | 6.644 | 34.96 |
| 12 | 0 | −1.227 | −1.106 | 1.110 | 34.19 |
| 13 | 0 | −1.950 | −12.851 | 0.586 | 34.19 |
| 14 | 0 | −1.973 | −0.891 | 2.213 | 34.19 |
| 15 | 0 | −1.843 | −0.497 | 3.710 | 34.19 |

TABLE 20

S6

| LENS NO. | NUMBER OF INFECTION POINTS (WITHIN EFFECTIVE RADIUS) | $A_{s6}$ (mm) | $S_{s6}$ (mm) | $A_{s6}/S_{s6}$ | EFFECTIVE RADIUS (mm) |
|---|---|---|---|---|---|
| 1 | 1 | 2.842 | 5.210 | 0.545 | 34.16 |
| 2 | 0 | 7.814 | 6.888 | 1.134 | 34.55 |
| 3 | 1 | 2.066 | 5.871 | 0.362 | 34.22 |
| 4 | 1 | 3.287 | 5.001 | 0.657 | 34.16 |
| 5 | 1 | 3.026 | 5.159 | 0.587 | 34.16 |
| 6 | 1 | 9.044 | 6.804 | 1.329 | 34.45 |
| 7 | 1 | 9.259 | 6.975 | 1.327 | 34.62 |
| 8 | 1 | 0.910 | 5.783 | 0.157 | 34.72 |
| 9 | 1 | 0.925 | 5.784 | 0.160 | 35.76 |
| 10 | 1 | 6.295 | 6.314 | 0.997 | 34.08 |
| 11 | 1 | 2.560 | 5.020 | 0.510 | 34.68 |
| 12 | 1 | 3.791 | 5.239 | 0.724 | 34.16 |
| 13 | 1 | 3.000 | 5.184 | 0.579 | 34.16 |
| 14 | 1 | 2.944 | 5.173 | 0.569 | 34.16 |
| 15 | 1 | 2.766 | 5.239 | 0.528 | 34.16 |

TABLE 21

S7

| LENS NO. | NUMBER OF INFECTION POINTS (WITHIN EFFECTIVE RADIUS) | $A_{S7}$ (mm) | $S_{S7}$ (mm) | $A_{S7}/S_{S7}$ | EFFECTIVE RADIUS (mm) |
|---|---|---|---|---|---|
| 1 | 0 | 21.003 | 17.778 | 1.181 | 36.34 |
| 2 | 0 | 20.028 | 19.67 | 1.018 | 36.13 |
| 3 | 0 | 21.351 | 19.362 | 1.103 | 36.22 |
| 4 | 0 | 20.437 | 16.903 | 1.209 | 36.34 |
| 5 | 0 | 20.388 | 17.455 | 1.168 | 36.34 |
| 6 | 0 | 21.740 | 21.846 | 0.995 | 39.33 |
| 7 | 0 | 21.820 | 22.242 | 0.981 | 39.33 |
| 8 | 0 | 21.360 | 16.406 | 1.302 | 36.21 |
| 9 | 0 | 21.436 | 16.354 | 1.311 | 36.16 |
| 10 | 0 | 20.314 | 22.440 | 0.905 | 36.88 |
| 11 | 0 | 21.607 | 17.151 | 1.260 | 36.05 |

TABLE 21-continued

| | S7 | | | |
|---|---|---|---|---|
| LENS NO. | NUMBER OF INFECTION POINTS (WITHIN EFFECTIVE RADIUS) | $A_{S7}$ (mm) | $S_{S7}$ (mm) | $A_{S7}/S_{S7}$ | EFFECTIVE RADIUS (mm) |
| 12 | 0 | 21.090 | 19.138 | 1.102 | 36.34 |
| 13 | 0 | 20.968 | 18.222 | 1.151 | 36.34 |
| 14 | 0 | 20.937 | 18.154 | 1.153 | 36.34 |
| 15 | 0 | 20.680 | 17.821 | 1.161 | 36.34 |

What is claimed is:

1. A projection lens unit having a plurality of lens elements for magnifying and projecting an original image displayed on an image source, onto a screen, comprising:
   a first lens group including a meniscus lens which has a positive refractive power and which has a center part configured so as to be convex on the screen side thereof;
   a second lens group including a power lens having a highest positive refractive power among the plurality of lens elements;
   a third lens group composed of a single lens element having opposite side surfaces which are convex near an optical axis thereof, having a positive refractive power, and having a peripheral part which has meniscus concave configuration on the image source side thereof, and
   a fourth lens group having a lens surface which is concave on the screen side thereof and having a negative refractive power,
   wherein the power lens has a following relationship:

$49 < (1/P_2) < 57$ where $P_2 = ((1/R_3) - (1/R_4))$
   $R_4$: a radius of curvature of an incident surface of the power lens, and
   $R_3$: a radius of curvature of an emergent surface of the power lens.

2. A projection lens unit as set forth in claim 1, wherein the power lens is made of a glass material having a refractive index of not greater than about 1.70.

3. A projection lens unit as set forth in claim 2, wherein at least one of the plurality lens elements has a surface on which two inflection points are present.

4. A projection lens unit as set forth in claim 1, wherein the power lens is made of a glass material having a refractive index in a range from about 1.63 to 1.70.

5. A projection lens unit as set forth in claim 1, wherein the power lens is made of a glass material having an Abbe's number of not less than 50.

6. A projection lens unit as set forth in claim 1, wherein the first and second lens groups satisfy the following relationships:

$0.01 < (f_0/f_1) < 0.15$ $0.85 < (f_0/f_2) < 0.95$ $0.30 < (f_0/f_3) < 0.45$ $-0.75 < (f_0/f_4) < -0.50$ where $F_0$: a focal distance of the entire projection lens unit;

$f_1$: a focal distance of the first lens group;
$f_2$: a focal distance of the second lens group;
$f_3$: a focal distance of the third lens group; and
$f_4$: a focal distance of the fourth lens group.

7. A projection lens unit as set forth in claim 1, wherein the first lens group has an emergent surface with a spherical degree $S_{S1}(r)$ and an aspheric degree $A_{S1}(r)$ and an incident surface with a spherical degree $S_{S2}(r)$ and an aspheric degree $A_{S2}(r)$, the third lens group has an emergent surface with a spherical degree $S_{S5}(r)$ and an aspheric degree $A_{S5}(r)$ and an incident surface with a spherical degree $S_{S6}(r)$ and an aspheric degree $A_{S6}(r)$, and the fourth lens group has an emergent surface with a spherical degree $S_{S7}(r)$ and an aspheric degree $A_{S7}(r)$, where r is set on an axis perpendicular to the optical axis extending from the screen to the imaged source, wherein the first lens group, the third lens group and the fourth lens group have the following relationships:

$0.15 < (A_{S1}(r)/S_{S1}(r)) < 0.35;$ $0.470 < (A_{S2}(r)/S_{S2}(r)) < 0.75;$ $-79.65 < (A_{S5}(r)/S_{S5}(r)) < 63.75;$ $0.10 < (A_{S6}(r)/S_{S6}(r)) < 1.35;$ and $0.15 < (A_{S7}(r)/S_{S7}(r)) < 1.35.$ 8. A projection lens unit as set forth in claim 1, wherein at least one of the plurality of lens elements is incorporated thereto a wavelength selective filter.

9. A projection lens unit having a plurality of lens elements for magnifying and projecting an original image displayed on an image source, onto a screen, comprising:
   a first lens group including a meniscus lens which has a positive refractive power and which has a center part configured so as to be convex on the screen side thereof;
   a second lens group including a power lens having a highest positive refractive power among the plurality of lens elements;
   a third lens group having opposite side surfaces which are convex near an optical axis thereof, having a positive refractive power, and having a peripheral part which has meniscus concave configuration on the image source side thereof, and
   a fourth lens group having a lens surface which is concave on the screen side thereof and having a negative refractive power,
   wherein the power lens has a following relationship:

$49 < (1/P_2) > 57$ where $P_2 = ((1/R_3) - (1/R_4))$
   $R_4$: a radius of curvature of an incident surface of the power lens, and
   $R_3$: a radius of curvature of an emergent surface of the power lens,
   wherein at least one of the plurality lens element has an aspheric surface with an aspheric coefficient of not less than 14-th order.

10. A rear projection type image display system characterized by a projection lens unit, which is located in front of an image source, and a transmission type screen including a Fresnel sheet, which is located in front of an imaging plane of the projection lens unit, the projection lens unit having a plurality of lens elements for magnifying and projecting an original image displayed on the image source, onto the screen, and comprising:

a first lens group including a meniscus lens which has a positive refractive power and which has a center part configured so as to be convex on the screen side thereof;

a second lens group including a power lens having a highest positive refractive power among the plurality of lens elements;

a third lens group composed of a single lens element having opposite side surfaces which are convex near an optical axis thereof, having a positive refractive power, and having a peripheral part which has meniscus concave configuration on the image source side thereof, and a fourth lens group having a lens surface which is concave on the screen side thereof and having a negative refractive power, wherein the power lens has a following relationship:

$$49 < (1/P_2) < 57$$

where $P_2 = ((1/R_3) - (1/R_4))$ $R_4$: a radius of curvature of an incident surface of the power lens, and $R_3$: a radius of curvature of an emergent surface of the power lens.

11. A rear projection type image display system as set forth in claim 10, wherein the power lens is made of a glass material having a refractive index of not greater than about 1.70.

12. A rear projection type image display system as set forth in claim 11, wherein at least one of the plurality lens elements has a surface on which two inflection points are present.

13. A rear projection type image display system as set forth in claim 10, wherein the power lens is made of a glass material having a refractive index in a range from about 1.63 to 1.70.

14. A rear projection type image display system as set forth in claim 10, wherein the power lens is made of a glass material having an Abbe's number of not less than 50.

15. A rear projection type image display system as set forth in claim 10, wherein the first and second lens groups satisfy the following relationships:

$$0.01 < (f_0/f_1) < 0.15$$

$$0.85 < (f_0/f_2) < 0.95$$

$$0.30 < (f_0/f_3) < 0.45$$

$$-0.75 < (f_0/f_4) < -0.50$$

where $F_0$: a focal distance of the entire projection lens unit;

$f_1$: a focal distance of the first lens group;

$f_2$: a focal distance of the second lens group;

$f_3$: a focal distance of the third lens group; and $f_4$: a focal distance of the fourth lens group.

16. A rear projection type image display system as set forth in claim 10, wherein the first lens group has an emergent surface with a spherical degree $S_{S1}(r)$ and an aspheric degree $A_{S1}(r)$ and an incident surface with a spherical degree $S_{S2}(r)$ and an aspheric degree $A_{S2}(r)$, the third lens group has an emergent surface with a spherical degree $S_{S5}(r)$ and an aspheric degree $A_{S5}(r)$ and an incident surface with a spherical degree $S_{S6}(r)$ and an aspheric degree $A_{S6}(r)$, and the fourth lens group has an emergent surface with a spherical degree $S_{S7}(r)$ and an aspheric degree $A_{S7}(r)$, where r is set on an axis perpendicular to the optical axis extending from the screen to the image source, wherein the first lens group, the third lens group and the fourth lens group have the following relationships:

$$0.15 < (A_{S1}(r)/S_{S1}(r)) < 0.35;$$

$$0.470 < (A_{S2}(r)/S_{S2}(r)) < 0.75;$$

$$-79.65 < (A_{S5}(r)/S_{S5}(r)) < 63.75;$$

$$0.10 < (A_{S6}(r)/S_{S6}(r)) < 1.35;\text{ and}$$

$$0.15 < (A_{S7}(r)/S_{S7}(r)) < 1.35.$$

17. A rear projection type image display system as set forth in claim 10, wherein at least one of the plurality of lens elements is incorporated thereto a wavelength selective filter.

18. A rear projection type image display system characterized by a projection lens unit, which is located in front of an image source, and a transmission type screen including a Fresnel sheet, which is located in front of an imaging plane of the projection lens unit, the projection lens unit having a plurality of lens elements for magnifying and projecting an original image displayed on the image source, onto the screen, and comprising:

a first lens group including a meniscus lens which has a positive refractive power and which has a center part configured so as to be convex on the screen side thereof;

a second lens group including a power lens having a highest positive refractive power among the plurality of lens elements;

a third lens group having opposite side surfaces which are convex near an optical axis thereof, having a positive refractive power, and having a peripheral part which has meniscus concave configuration on the image source side thereof, and a fourth lens group having a lens surface which is concave on the screen side thereof and having a negative refractive power, wherein the power lens has a following relationship:

$$49 < (1/P_2) < 57$$

where $P_2 = ((1/R_3) - (1/R_4))$ $R_4$: a radius of curvature of an incident surface of the power lens, and $R_3$: a radius of curvature of an emergent surface of the power lens, wherein at least one of the plurality lens element has an aspheric surface with an aspheric coefficient of not less than 14-th order.

* * * * *